US011116006B2

(12) United States Patent
Islam et al.

(10) Patent No.: US 11,116,006 B2
(45) Date of Patent: Sep. 7, 2021

(54) UPLINK TRANSMISSION PARAMETER SELECTION FOR RANDOM ACCESS INITIAL MESSAGE TRANSMISSION AND RETRANSMISSION

(71) Applicant: QUALCOMM Incorporated, San Diego, CA (US)

(72) Inventors: Muhammad Nazmul Islam, Edison, NJ (US); Sumeeth Nagaraja, San Diego, CA (US); Tao Luo, San Diego, CA (US); Bilal Sadiq, Basking Ridge, NJ (US); Junyi Li, Chester, NJ (US); Sundar Subramanian, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/807,132

(22) Filed: Nov. 8, 2017

(65) Prior Publication Data
US 2018/0176948 A1 Jun. 21, 2018

Related U.S. Application Data

(60) Provisional application No. 62/435,463, filed on Dec. 16, 2016.

(51) Int. Cl.
*H04W 74/00* (2009.01)
*H04W 52/14* (2009.01)
(Continued)

(52) U.S. Cl.
CPC ......... *H04W 74/008* (2013.01); *H04L 1/0015* (2013.01); *H04W 52/146* (2013.01);
(Continued)

(58) Field of Classification Search
CPC .......... H04W 74/008; H04W 74/0833; H04W 52/146; H04W 52/36; H04W 52/50;
(Continued)

(56) References Cited

U.S. PATENT DOCUMENTS 9,386,604 B2  7/2016 Dinan
9,699,811 B2 * 7/2017 Nuggehalli ....... H04W 74/0833
(Continued)

FOREIGN PATENT DOCUMENTS

| CN | 105122662 A | 12/2015 |
|---|---|---|
| WO | WO-2016172174 A1 | 10/2016 |
| WO | WO 2017044155 A1 | 3/2017 |

OTHER PUBLICATIONS

ISA/EP, International Search Report and Written Opinion of the International Searching Authority, Int'l Application No. PCT/US2017/060890, dated Jan. 18, 2018, European Patent Office, Rijswijk, NL, 13 pgs.

(Continued)

*Primary Examiner* — Yemane Mesfin
*Assistant Examiner* — Intekhaab A Siddiquee
(74) *Attorney, Agent, or Firm* — QUALCOMM Incorporated

(57) ABSTRACT

Methods, systems, and devices for wireless communication are described that provide for selecting different uplink transmission parameters for transmission or retransmission of a random access message. A user equipment (UE) may retransmit a random access message to a base station during a random access procedure if an initial transmission of the random access message was unsuccessfully received by the base station. The UE may select a different transmission beam, uplink resource, or transmission power for retransmission of the random access message. The selection may be based on path loss associated with synchronization signals (Continued)

or previous transmissions. The selection may also be based on a maximum number of retransmissions.

13 Claims, 16 Drawing Sheets

(51) Int. Cl.

| | |
|---|---|
| H04W 52/24 | (2009.01) |
| H04W 52/36 | (2009.01) |
| H04L 1/00 | (2006.01) |
| H04W 52/50 | (2009.01) |
| H04W 74/08 | (2009.01) |
| H04W 52/48 | (2009.01) |

(52) U.S. Cl.
CPC ......... *H04W 52/242* (2013.01); *H04W 52/36* (2013.01); *H04W 52/50* (2013.01); *H04W 74/0833* (2013.01); *H04L 1/0009* (2013.01); *H04W 52/48* (2013.01)

(58) Field of Classification Search
CPC ... H04W 52/48; H04W 52/242; H04W 16/28; H04W 72/046; H04L 1/0015; H04L 1/0009
USPC ........................................................ 370/329
See application file for complete search history.

(56) References Cited

U.S. PATENT DOCUMENTS

| | | |
|---|---|---|
| 2010/0255847 A1 | 10/2010 | Lee et al. |
| 2013/0102345 A1* | 4/2013 | Jung .................... H04B 7/0456 455/513 |
| 2013/0217404 A1 | 8/2013 | Jung |
| 2014/0016573 A1 | 1/2014 | Nuggehalli et al. |
| 2014/0376466 A1 | 12/2014 | Jeong et al. |
| 2015/0036622 A1 | 2/2015 | Yang et al. |
| 2016/0066197 A1* | 3/2016 | Park ...................... H04W 16/28 370/329 |
| 2016/0172174 A1 | 6/2016 | Takahashi |
| 2016/0183234 A1 | 6/2016 | Sung et al. |
| 2016/0227575 A1 | 8/2016 | Furuskog et al. |

OTHER PUBLICATIONS

Samsung: "RACH Design with and without Beam Reciprocity," 3GPP TSG RAN WG1 #86 bis, R1-1609118, Oct. 2016, 5 pages.
Taiwan Search Report—TW106138920—TIPO—dated Feb. 21, 2021.

* cited by examiner

UPLINK TRANSMISSION PARAMETER SELECTION FOR RANDOM ACCESS INITIAL MESSAGE TRANSMISSION AND RETRANSMISSION

CROSS REFERENCES

The present application for patent claims priority to U.S. Provisional Patent Application No. 62/435,463 by Islam, et al., entitled "UPLINK TRANSMISSION PARAMETER SELECTION FOR RANDOM ACCESS INITIAL MESSAGE TRANSMISSION AND RETRANSMISSION," filed Dec. 16, 2016, assigned to the assignee hereof.

BACKGROUND

The following relates generally to wireless communication, and more specifically to uplink transmission parameter selection for transmission or retransmission of a random access initial message.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, a UE may utilize a directional transmission to gain access to a medium. In some cases, the UE may retransmit the directional transmission if the UE does not receive an appropriate response from a base station (e.g., due to interference, the base station may not receive the transmission from the UE). However, retransmitting the directional transmission in the same direction and using the same resources may not improve the probability of reception at the base station.

SUMMARY

The described techniques relate to improved methods, systems, devices, or apparatus that support uplink transmission parameter selection for random access initial message transmission or retransmission. In a wireless communications system, such as a millimeter wave (mmW) system, a base station and a user equipment (UE) may utilize directional transmissions during a random access channel (RACH) procedure. In some cases, after transmitting a directional initial RACH message, the UE may not receive an appropriate response from a base station and may then retransmit the directional initial RACH message, which may be referred to as a directional RACH request message. During retransmission, the UE may select different parameters (e.g., transmission power, RACH resources, beam) than those used in an initial transmission or in previous transmissions (e.g., if the UE is retransmitting multiple times). In a system with beam reciprocity, the UE may select the parameters based on a path loss estimate and a number of retransmissions. In some cases, the UE may have maximum numbers of retransmissions associated with a RACH resource, a beam, a transmission power, or a combination thereof. In a system without beam reciprocity, the UE may select the parameters based on the path loss estimate and a maximum difference in array gain for the base station between uplink and downlink beams.

A method of wireless communication is described. The method may include identifying a first uplink transmission beam for a random access procedure, transmitting, to a base station, a random access message using the first uplink transmission beam, selecting a second uplink transmission beam based at least in part on an absence of a random access response from the base station corresponding to the random access message transmitted using the first uplink transmission beam, determining an uplink transmission power based at least in part on the selection of the second uplink transmission beam, and retransmitting the random access message to the base station using the second uplink transmission beam and the determined uplink transmission power.

An apparatus for wireless communication is described. The apparatus may include means for identifying a first uplink transmission beam for a random access procedure, means for transmitting, to a base station, a random access message using the first uplink transmission beam, means for selecting a second uplink transmission beam based at least in part on an absence of a random access response from the base station corresponding to the random access message transmitted using the first uplink transmission beam, means for determining an uplink transmission power based at least in part on the selection of the second uplink transmission beam, and means for retransmitting the random access message to the base station using the second uplink transmission beam and the determined uplink transmission power.

Another apparatus for wireless communication is described. The apparatus may include a processor, memory in electronic communication with the processor, and instructions stored in the memory. The instructions may be operable to cause the processor to identify a first uplink transmission beam for a random access procedure, transmit, to a base station, a random access message using the first uplink transmission beam, select a second uplink transmission beam based at least in part on an absence of a random access response from the base station corresponding to the random access message transmitted using the first uplink transmission beam, determine an uplink transmission power based at least in part on the selection of the second uplink transmission beam, and retransmit the random access message to the base station using the second uplink transmission beam and the determined uplink transmission power.

A non-transitory computer readable medium for wireless communication is described. The non-transitory computer-readable medium may include instructions operable to cause a processor to identify a first uplink transmission beam for a random access procedure, transmit, to a base station, a random access message using the first uplink transmission beam, select a second uplink transmission beam based at least in part on an absence of a random access response from the base station corresponding to the random access message transmitted using the first uplink transmission beam, determine an uplink transmission power based at least in part on the selection of the second uplink transmission beam, and retransmit the random access message to the base station using the second uplink transmission beam and the determined uplink transmission power.

In some examples of the method, apparatus, and non-transitory computer-readable medium described above, the second uplink transmission beam is the same as the first uplink transmission beam.

Some examples of the method, apparatus, and non-transitory computer-readable medium described above may further include processes, features, means, or instructions for determining a path loss associated with retransmission of the random access message using the second uplink transmission beam, wherein the uplink transmission power is based at least in part on the path loss. Some examples of the method, apparatus, and non-transitory computer-readable medium described above may further include processes, features, means, or instructions for increasing the uplink transmission power by an additional amount, wherein the additional amount is based at least in part on a number of retransmissions. In some examples of the method, apparatus, and non-transitory computer-readable medium described above, the additional amount is a function of a power ramping counter. In some examples of the method, apparatus, and non-transitory computer-readable medium described above, the power ramping counter is based at least in part on the number of retransmissions and a number of uplink transmission beam changes. In some examples of the method, apparatus, and non-transitory computer-readable medium described above, a value of the power ramping counter is equal to the number of retransmissions minus the number of uplink transmission beam changes.

In some examples of the method, apparatus, and non-transitory computer-readable medium described above, the second uplink transmission beam is different than the first uplink transmission beam.

Some examples of the method, apparatus, and non-transitory computer-readable medium described above may further include processes, features, means, or instructions for determining a path loss associated with retransmission of the random access message using the second uplink transmission beam, wherein the uplink transmission power is based at least in part on the determined path loss.

Some examples of the method, apparatus, and non-transitory computer-readable medium described above may further include processes, features, means, or instructions for maintaining a same power ramping counter value based at least in part on the second uplink transmission beam being different than the first uplink transmission beam, wherein the uplink transmission power is based at least in part on the same power ramping counter value. Some examples of the method, apparatus, and non-transitory computer-readable medium described above may further include processes, features, means, or instructions for increasing the uplink transmission power by an additional amount, wherein the additional amount is equal to a power ramped amount associated with transmission of the random access message using the first uplink transmission beam.

Some examples of the method, apparatus, and non-transitory computer-readable medium described above may further include processes, features, means, or instructions for receiving, from the base station, a maximum retransmission number, wherein retransmitting the random access message may be based at least in part on the maximum retransmission number.

In some examples of the method, apparatus, and non-transitory computer-readable medium described above, the maximum retransmission number may be associated with at least one of a total number of retransmission attempts of the random access message, a number of retransmission attempts of the random access message for each of a plurality of uplink transmission powers, a number of retransmission attempts of the random access message for each of a plurality of random access resources, or a number of retransmission attempts of the random access message for each combination of uplink transmission powers and random access resources.

Some examples of the method, apparatus, and non-transitory computer-readable medium described above may further include processes, features, means, or instructions for selecting a random access resource for retransmission of the random access message, the random access resource corresponding to a lowest uplink transmission power.

An additional method of wireless communication is described. The method may include identifying a first random access resource for a random access procedure, transmitting, to a base station, a random access message using the first random access resource, selecting a second random access resource based at least in part on an absence of a random access response from the base station corresponding to the random access message transmitted using the first random access resource, determining an uplink transmission power based at least in part on the selection of the second random access resource, and retransmitting the random access message to the base station using the second random access resource and the determined uplink transmission power.

An apparatus for wireless communication is described. The apparatus may include means for identifying a first random access resource for a random access procedure, means for transmitting, to a base station, a random access message using the first random access resource, means for selecting a second random access resource based at least in part on an absence of a random access response from the base station corresponding to the random access message transmitted using the first random access resource, means for determining an uplink transmission power based at least in part on the selection of the second random access resource, and means for retransmitting the random access message to the base station using the second random access resource and the determined uplink transmission power.

Another apparatus for wireless communication is described. The apparatus may include a processor, memory in electronic communication with the processor, and instructions stored in the memory. The instructions may be operable to cause the processor to identify a first random access resource for a random access procedure, transmit, to a base station, a random access message using the first random access resource, select a second random access resource based at least in part on an absence of a random access response from the base station corresponding to the random access message transmitted using the first random access resource, determine an uplink transmission power based at least in part on the selection of the second random access resource, and retransmit the random access message to the base station using the second random access resource and the determined uplink transmission power.

A non-transitory computer readable medium for wireless communication is described. The non-transitory computer-readable medium may include instructions operable to cause a processor to identify a first random access resource for a random access procedure, transmit, to a base station, a random access message using the first random access resource, select a second random access resource based at least in part on an absence of a random access response from the base station corresponding to the random access message transmitted using the first random access resource, determine an uplink transmission power based at least in part on the selection of the second random access resource, and retransmit the random access message to the base station using the second random access resource and the determined uplink transmission power.

In some examples of the method, apparatus, and non-transitory computer-readable medium described above, the first random access resource and the second random access resource each comprise one or more combinations of time-frequency resources and a random access preamble. In some examples of the method, apparatus, and non-transitory computer-readable medium described above, the first random access resource and the second random access resource each correspond to a synchronization signal block of the base station.

Some examples of the method, apparatus, and non-transitory computer-readable medium described above may further include processes, features, means, or instructions for measuring a quality of a downlink synchronization resource, wherein selecting the second random access resource is based at least in part on the quality of the downlink synchronization resource.

In some examples of the method, apparatus, and non-transitory computer-readable medium described above, the quality of the downlink synchronization resource comprises at least one of a signal to noise ratio, a signal to interference plus noise ratio, a channel quality indication, a reference signal received power, a received signal strength indicator, or any combinations thereof.

Some examples of the method, apparatus, and non-transitory computer-readable medium described above may further include processes, features, means, or instructions for determining a path loss associated with the retransmission of the random access message using the second random access resource, wherein the uplink transmission power is based at least in part on the determined path loss.

In some examples of the method, apparatus, and non-transitory computer-readable medium described above, the second random access resource is the same as the first random access resource. Some examples of the method, apparatus, and non-transitory computer-readable medium described above may further include processes, features, means, or instructions for increasing the uplink transmission power by an additional amount based at least in part on a number of retransmissions.

In some examples of the method, apparatus, and non-transitory computer-readable medium described above, the second random access resource is different than the first random access resource. Some examples of the method, apparatus, and non-transitory computer-readable medium described above may further include processes, features, means, or instructions for maintaining a same power ramping counter value based at least in part on the second random access resource being different than the first random access resource, wherein the uplink transmission power is based at least in part on the same power ramping counter value.

In some examples of the method, apparatus, and non-transitory computer-readable medium described above, the second random access resource is different than the first random access resource. Some examples of the method, apparatus, and non-transitory computer-readable medium described above may further include processes, features, means, or instructions for increasing the uplink transmission power by an additional amount, wherein the additional amount is equal to a power ramped amount associated with transmitting the random access message using the first random access resource.

Some examples of the method, apparatus, and non-transitory computer-readable medium described above may further include processes, features, means, or instructions for receiving, from the base station, a maximum retransmission number, wherein retransmitting the random access message may be based at least in part on the maximum retransmission number.

In some examples of the method, apparatus, and non-transitory computer-readable medium described above, the maximum retransmission number may be associated with at least one of a total number of retransmission attempts of the random access message, a number of retransmission attempts of the random access message for each of a plurality of uplink transmission powers, a number of retransmission attempts of the random access message for each of a plurality of random access resources, or a number of retransmission attempts of the random access message for each combination of uplink transmission powers and random access resources.

Some examples of the method, apparatus, and non-transitory computer-readable medium described above may further include processes, features, means, or instructions for selecting an uplink transmission beam for retransmission of the random access message, the uplink transmission beam corresponding to a lowest uplink transmission power.

A method of wireless communication is described. The method may include transmitting, using a first set of beams, multiple downlink synchronization signals, receiving, using a second set of beams, uplink RACH signals from one or more wireless devices, and transmitting, to the one or more wireless devices, characteristics of a difference in signal strength between the first set of beams and the second set of beams at different coverage angles.

An apparatus for wireless communication is described. The apparatus may include means for transmitting, using a first set of beams, multiple downlink synchronization signals, means for receiving, using a second set of beams, uplink RACH signals from one or more wireless devices, and means for transmitting, to the one or more wireless devices, characteristics of a difference in signal strength between the first set of beams and the second set of beams at different coverage angles.

Another apparatus for wireless communication is described. The apparatus may include a processor, memory in electronic communication with the processor, and instructions stored in the memory. The instructions may be operable to cause the processor to transmit, using a first set of beams, multiple downlink synchronization signals, receive, using a second set of beams, uplink RACH signals from one or more wireless devices, and transmit, to the one or more wireless devices, characteristics of a difference in signal strength between the first set of beams and the second set of beams at different coverage angles.

A non-transitory computer readable medium for wireless communication is described. The non-transitory computer-readable medium may include instructions operable to cause a processor to transmit, using a first set of beams, multiple downlink synchronization signals, receive, using a second set of beams, uplink RACH signals from one or more wireless devices, and transmit, to the one or more wireless devices, characteristics of a difference in signal strength between the first set of beams and the second set of beams at different coverage angles.

In some examples of the method, apparatus, and non-transitory computer-readable medium described above, the characteristics of the difference in signal strength comprise a maximum signal strength difference between any beam of the first set of beams and a corresponding beam of the second set of beams.

In some examples of the method, apparatus, and non-transitory computer-readable medium described above, the characteristics of the difference in signal strength comprise an average signal strength difference between any beam of the first set of beams and a corresponding beam of the second set of beams.

In some examples of the method, apparatus, and non-transitory computer-readable medium described above, the difference in signal strength may be determined based at least in part on a number of beams in the first set of beams and a number of beams in the second set of beams.

In some examples of the method, apparatus, and non-transitory computer-readable medium described above, the characteristics may be conveyed via a master information block, a system information block, a PBCH, an extended PBCH (ePBCH), a physical downlink shared channel (PDSCH), a physical downlink control channel (PDCCH), or any combination thereof.

Some examples of the method, apparatus, and non-transitory computer-readable medium described above may further include processes, features, means, or instructions for receiving a retransmission of an uplink RACH signal from a wireless device, wherein the retransmission may be received at a power level different from an initial transmission of the uplink RACH signal from the wireless device.

A method of wireless communication is described. The method may include receiving, via a first set of beams of a base station, multiple downlink synchronization signals, transmitting, to a second set of beams of the base station, a RACH signal based at least in part on the multiple downlink synchronization signals, and receiving, from the base station, characteristics of a difference in signal strength between the first set of beams and the second set of beams at different coverage angles.

An apparatus for wireless communication is described. The apparatus may include means for receiving, via a first set of beams of a base station, multiple downlink synchronization signals, means for transmitting, to a second set of beams of the base station, a RACH signal based at least in part on the multiple downlink synchronization signals, and means for receiving, from the base station, characteristics of a difference in signal strength between the first set of beams and the second set of beams at different coverage angles.

Another apparatus for wireless communication is described. The apparatus may include a processor, memory in electronic communication with the processor, and instructions stored in the memory. The instructions may be operable to cause the processor to receive, via a first set of beams of a base station, multiple downlink synchronization signals, transmit, to a second set of beams of the base station, a RACH signal based at least in part on the multiple downlink synchronization signals, and receive, from the base station, characteristics of a difference in signal strength between the first set of beams and the second set of beams at different coverage angles.

A non-transitory computer readable medium for wireless communication is described. The non-transitory computer-readable medium may include instructions operable to cause a processor to receive, via a first set of beams of a base station, multiple downlink synchronization signals, transmit, to a second set of beams of the base station, a RACH signal based at least in part on the multiple downlink synchronization signals, and receive, from the base station, characteristics of a difference in signal strength between the first set of beams and the second set of beams at different coverage angles.

In some examples of the method, apparatus, and non-transitory computer-readable medium described above, the characteristics of the difference in signal strength comprise a maximum signal strength difference between any beam of the first set of beams and a corresponding beam of the second set of beams.

In some examples of the method, apparatus, and non-transitory computer-readable medium described above, the characteristics of the difference in signal strength comprise an average signal strength difference between any beam of the first set of beams and a corresponding beam of the second set of beams.

Some examples of the method, apparatus, and non-transitory computer-readable medium described above may further include processes, features, means, or instructions for determining a path loss based at least in part on the characteristics of the difference in signal strength. Some examples of the method, apparatus, and non-transitory computer-readable medium described above may further include processes, features, means, or instructions for determining an uplink transmission power for transmission of the RACH signal based at least in part on the path loss.

Some examples of the method, apparatus, and non-transitory computer-readable medium described above may further include processes, features, means, or instructions for retransmitting the RACH signal based at least in part on the uplink transmission power.

DETAILED DESCRIPTION

In a wireless communications system, such as millimeter wave (mmW) or a new radio (NR) system, a base station and a user equipment (UE) may utilize directional random access channel (RACH) transmissions during a random access procedure. The base station may transmit multiple synchronization signals during a synchronization subframe. For example, the synchronization subframe may contain a number of symbols (e.g., 14 symbols) and the base station may transmit a directional synchronization signal in each symbol. Each directional synchronization signal may be transmitted in a different direction. The UE may receive one or more directional synchronization signals, and may determine a RACH resource and an uplink transmission beam for a directional RACH request message transmission, which may be transmitted to gain initial network access. The base station may listen for signals (e.g., a RACH request message, a random access message, a Message 1 (Msg1) transmission) in different directions and different time slots and if the base station successfully receives a directional RACH request message from a UE, the base station may transmit a directional RACH response message to the UE in response to the RACH request message.

In some cases, the UE may not receive a directional RACH response message from the base station. For example, the direction RACH request message may not be successfully received at the base station and thus, the base station may not transmit a response to the UE. In such instances, the UE may select different parameters for a retransmission of the directional RACH request message and the UE may retransmit the directional RACH request message to the base station (e.g., after a predetermined time period has passed). In some cases, the UE may determine to adjust the retransmission power or avoid the symbol or beam that previously failed. For example, the UE may select a different transmission power, RACH resource, or beam than those used in the previous transmission(s) or previous retransmission(s). In some cases, the UE may retransmit the directional RACH request message using a same power ramped value (e.g., based on a same power ramping counter value) as the previous transmission or retransmission based on selecting the different RACH resource or different uplink transmission beam.

Aspects of the disclosure are initially described in the context of wireless communications systems. Additional aspects of the disclosure are described with respect to synchronization resources and a process flow. Aspects of the disclosure are further illustrated by and described with reference to apparatus diagrams, system diagrams, and flowcharts that relate to uplink transmission parameter selection for random access initial message.

Figure 1:
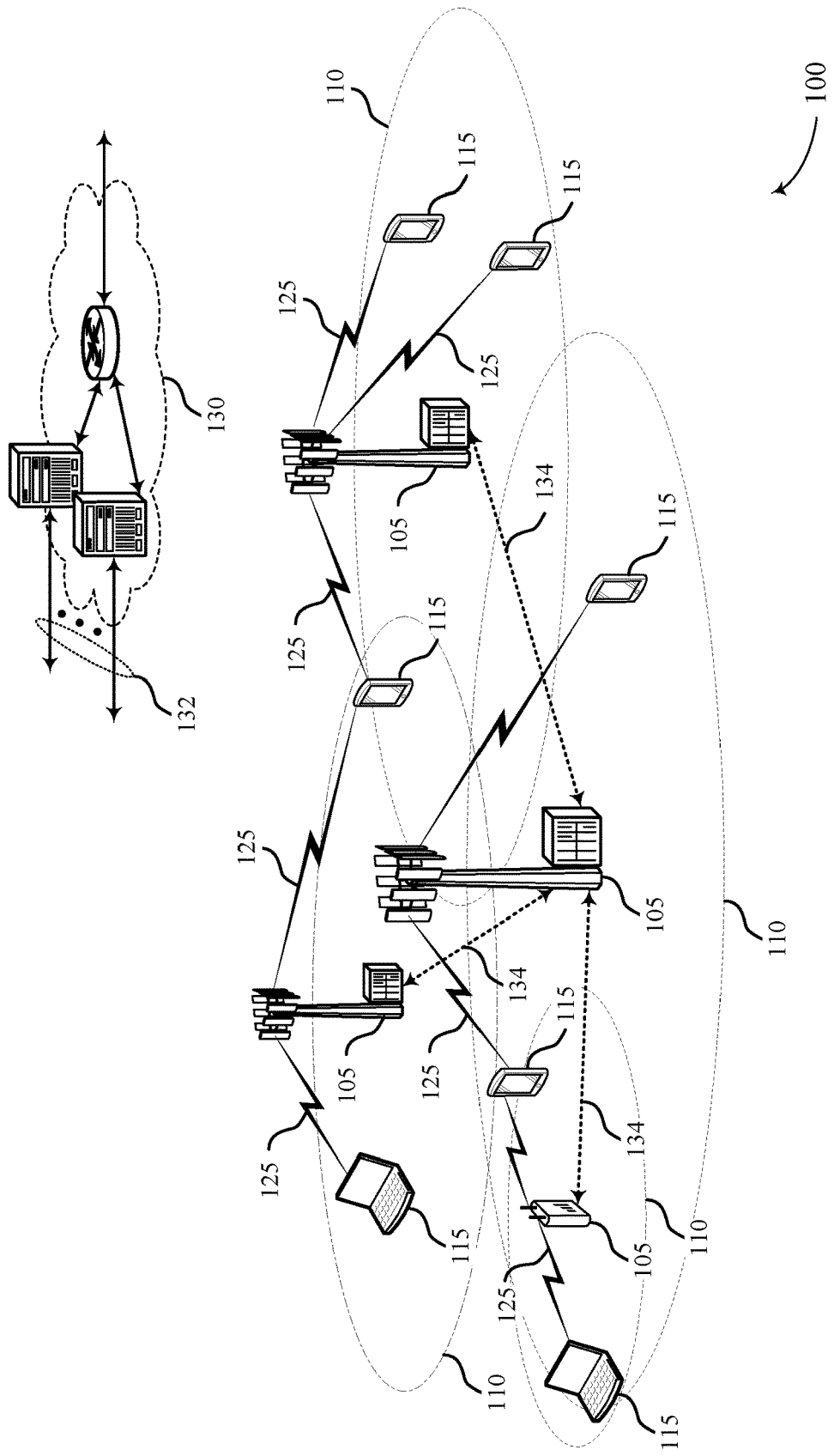
FIG. 1 illustrates an example of a wireless communications system that supports uplink transmission parameter selection for a random access initial message in accordance with aspects of the present disclosure.

FIG. 1 illustrates an example of a wireless communications system 100 that supports uplink transmission parameter selection for a random access initial message in accordance with various aspects of the present disclosure. The wireless communications system 100 includes base stations 105, UEs 115, and a core network 130. In some examples, the wireless communications system 100 may be a Long Term Evolution (LTE) or LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) Gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched Streaming Service (PSS).

Wireless communications system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat requests (HARM) to provide retransmission at the MAC layer to improve link efficiency. In the control plane, the Radio Resource Control (RRC) protocol layer may provide establishment, configuration, and maintenance of an RRC connection between a UE 115 and a network device (e.g., a base station 105) or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5 ms slots, each of which may contain 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI (sTTI) bursts or in selected component carriers using sTTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. A device, such as a UE 115 or base station 105, utilizing eCCs may transmit wideband signals (e.g., 20, 40, 60, 80 Mhz, etc.) at reduced symbol durations (e.g., 16.67 microseconds).

In some cases, wireless system 100 may utilize both licensed and unlicensed radio frequency spectrum bands. For example, wireless system 100 may employ LTE License Assisted Access (LTE-LAA) or LTE Unlicensed (LTE-U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some examples, a UE 115 and a base station 105 may participate in a directional RACH procedure. For instance, the base station 105 may transmit synchronization signals in different directions using different transmission beams. The UE 115 may receive one or more of the synchronization signals and select RACH resources for transmission of an initial random access message based on the reception of the synchronization signals. In some instances, the UE 115 may not receive an appropriate response to the initial random access message from the base station 105. For instance, the base station 105 may not successfully receive the initial random access message from the UE 115 and the UE 115 may decide to retransmit the initial random access message using different uplink parameters (e.g., RACH resource, transmission power, transmission beam, etc.) in an attempt to successfully reach the base station 105.

Figure 2:
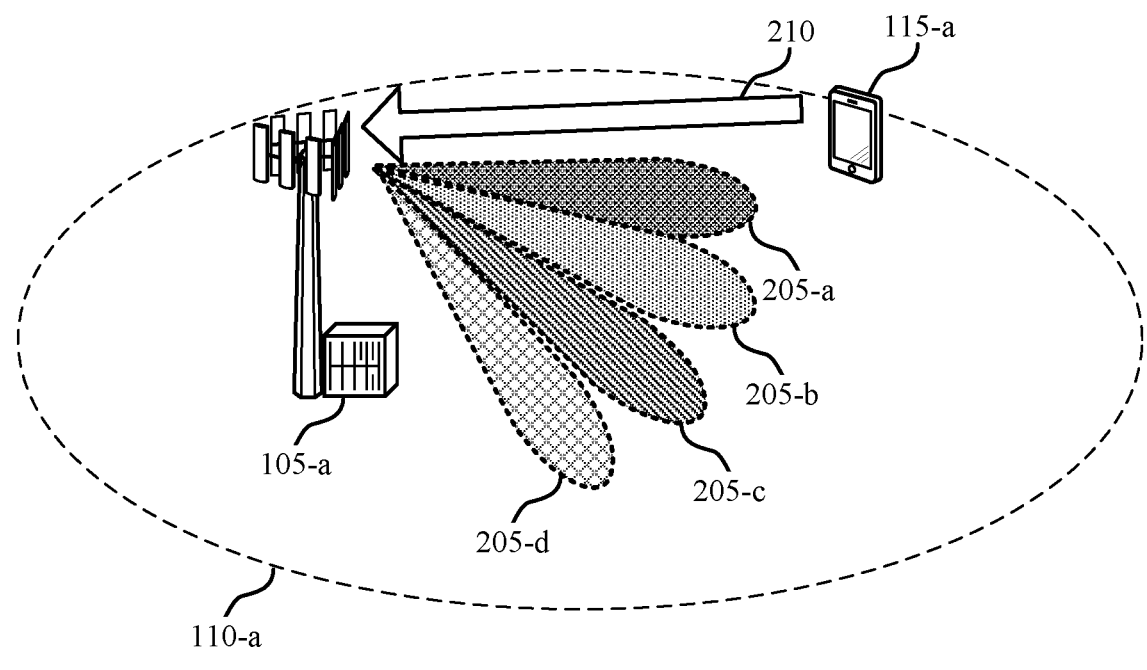
FIG. 2 illustrates an example of a wireless communications system that supports uplink transmission parameter selection for a random access initial message in accordance with aspects of the present disclosure.
Figure 2:
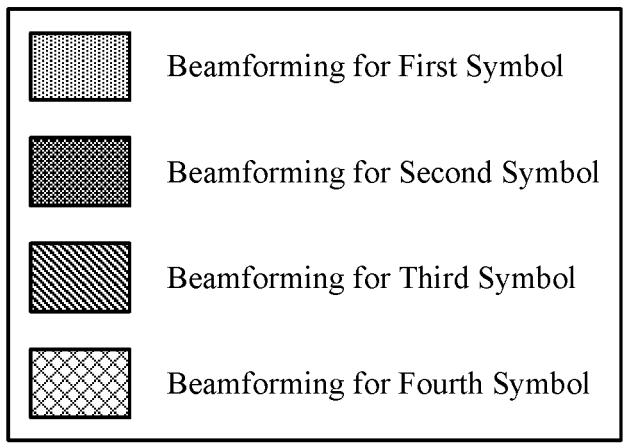

FIG. 2 illustrates an example of a wireless communications system 200 that supports uplink transmission parameter selection for a random access initial message in accordance with various aspects of the present disclosure. Wireless communications system 200 may include UE 115-a and base station 105-a, which may be examples of the corresponding devices described with reference to FIG. 1.

In some systems, such as a mmW system, base station 105-a and UE 115-a may utilize directional RACH transmissions. Base station 105-a may transmit multiple synchronization signals (e.g., a primary synchronization signal (PSS), a secondary synchronization signal (SSS), a beam reference signal (BRS), an extended synchronization signal (ESS), a physical broadcast channel (PBCH), etc.) during a synchronization subframe. For example, the synchronization subframe may include a number of symbols (e.g., 1, 8, 14, 20 symbols, etc.). Base station 105-a may transmit a directional synchronization signal in each symbol. Each directional synchronization signal may be transmitted in a different direction and on a different beam 205 in order to cover a portion of or all of coverage area 110-a. For example, base station 105-a may transmit a first directional synchronization signal over beam 205-a in a first symbol, a second directional synchronization signal over beam 205-b in a second symbol, a third directional synchronization signal over beam 205-c in a third symbol, and a fourth directional synchronization signal over beam 205-d in a fourth symbol of a synchronization subframe. It should be understood that base station 105-a may transmit any number of directional synchronization signals without departing from the scope of the disclosure.

UE 115-a may receive a directional synchronization signal (e.g., over beam 205-a), and may determine a RACH resource and a beam (e.g., the first symbol and beam 205-a) for an initial random access message, such as a directional RACH request message transmission to gain access to the network. The initial random access message may be referred to as a RACH preamble message or a RACH Msg1 transmission. In some cases, UE 115-a may receive multiple directional synchronization signals from base station 105-a, and may select one of the synchronization signals to determine uplink resources and an uplink beam for transmission. For example, the selection may be based on a received signal strength (e.g., reference signal received power (RSRP), received signal strength indication (RSSI), channel quality indicator (CQI), signal to noise ratio (SNR), etc.) of the directional synchronization signal. In some cases, UE 115-a may select RACH resources or an uplink transmission beam corresponding to the synchronization signal—or synchronization signal block—with the greatest RSSI or RSRP, among others.

Base station 105-a may listen for signals in different directions and different time slots and if the base station 105-a receives a directional RACH request message from UE 115-a, the base station 105-a may transmit a directional RACH response message to UE 115-*a* in response to the direction RACH request message. The RACH response message may be transmitted on a downlink shared channel (DL-SCH) and may include a temporary identifier, an uplink grant resource, a transmission power control (TPC) command, or other information for the UE 115-*a*.

In some cases, UE 115-*a* may not receive a directional RACH response message from base station 105-*a* and may select different parameters for retransmission of the directional RACH request message. For instance, after a predetermined time interval, UE 115-*a* may retransmit the directional RACH request message to base station 105-*a* and may select or adjust uplink transmission parameters (e.g., transmission power, resources, or transmission beam) to avoid the symbol or beam (e.g., the first symbol and beam 205-*a*) that previously failed. For example, UE 115-*a* may select a different transmission power, RACH resource, or beam 205 than those used in the initial transmission.

According to some aspects, the UE 115-*a* may select a different beam or RACH resource to retransmit the directional RACH request message. For example, the UE 115-*a* may receive multiple directional synchronization signals from the base station 105-*a*, and may determine a path loss estimate for each of the different directional synchronization signals. The UE 115-*a* may also try different downlink reception beams while receiving directional synchronization signals and estimate path loss for each of the downlink reception beams. Based on the path loss estimate, the UE 115-*a* may select a different uplink transmission beam or different RACH resources for retransmission.

UE 115-*a* may select a transmission power for transmission of the directional RACH request message based on the path loss estimate and a number of retransmissions for a base station 105 with beam reciprocity. In some cases, UE 115-*a* may determine a transmission power based on the path loss estimate. In other cases, UE 115-*a* may determine the transmission power based on the path loss estimate, but may increase the determined transmission power by an additional amount (e.g., where the additional amount corresponds to a power ramping function). In some examples, the additional amount may be a function of the number of retransmissions (e.g., the power ramping function may be a function of a power ramping coefficient and a number of retransmissions, wherein the greater the number of retransmissions, the greater the additional amount). A retransmission may be an example of an additional transmission of the directional RACH request message on a same uplink beam, in same random access resources, on a different uplink beam, on different random access resources, or some combination of these parameters. For example, in some cases, the number of retransmissions may increment when a same uplink transmission beam is used, a same random access resource is used, or both, but may not increment when one or both of these parameters are changed. In such cases, UE 115-*a* may use a same additional amount of power (e.g., power ramped amount) when retransmitting using a different uplink beam or different random access resources.

In some cases, UE 115-*a* may determine the transmission power based on the path loss estimate, and may determine whether to increase the determined transmission power by an additional amount. For example, UE 115-*a* may determine whether to increase the transmission power by an additional amount based on a difference between the path loss estimate and a previous path loss estimate (e.g., a path loss estimate for a synchronization signal). For example, if the difference between the path loss estimate and the previous path loss estimate is larger than a predetermined threshold, UE 115-*a* may increase the transmission power by the additional amount. If the difference between the path loss estimate and the previous path loss estimate is less than the predetermined threshold, UE 115-*a* may not increase the transmission power. The previous path loss estimate may be a path loss estimate for the original transmission or any subsequent retransmission prior to the current retransmission of the directional RACH request message. UE 115-*a* may transmit the directional RACH request message on a selected different beam 205-*b* or in the selected different RACH resource to the base station 105-*a* using the determined transmission power.

UE 115-*a* may select a RACH resource (e.g., corresponding to a time-frequency resource and a RACH preamble) based on a transmission power of a selected beam 205. In some cases, UE 115-*a* may select a different beam 205 to retransmit the directional RACH request message (e.g., beam 205-*b*). UE 115-*a* may select a RACH resource corresponding to the lowest transmission power for the retransmission. In some cases, the selected RACH resource may frequently change between retransmissions. For example, UE 115-*a* may select a different RACH resource if a transmission power of the different RACH resource is less than a designated transmission power of the current RACH resource by more than a predetermined threshold. The value of the predetermined threshold may be stored in a master information block (MIB), a system information block (SIB), a minimum SIB, or another type of SIB. In some cases, base station 105-*a* may transmit the predetermined threshold in the MIB, SIB, minimum SIB, or other type of SIB to UE 115-*a* over a PBCH, an extended PBCH (ePBCH), a physical downlink shared channel (PDSCH), or another appropriate channel.

In some cases, UE 115-*a* may have maximum numbers of retransmissions associated with a RACH resource, a beam 205, or a combination of the two. For example, UE 115-*a* may have a maximum number of retransmissions associated with a fixed RACH resource. For the fixed RACH resource, UE 115-*a* may select different transmission powers and beams 205 for each retransmission. In another example, UE 115-*a* may have a maximum number of retransmissions associated with a fixed beam 205 (e.g., beam 205-*a*). For beam 205-*a*, UE 115-*a* may select different transmission powers and RACH resources for each transmission. Additionally, UE 115-*a* may have a maximum number of retransmissions associated with a fixed RACH resource and a fixed beam 205 (e.g., beam 205-*a*). UE 115-*a* may select different transmission powers for each retransmission with the fixed RACH resource and beam 205-*a*. The values of the maximum numbers of retransmissions may be stored in the MIB, SIB, minimum SIB, or other type of SIB.

In some examples, a directional synchronization signal may not indicate an accurate path loss estimate for a base station 105 without beam reciprocity. This may also occur if the base station 105 decides to use a different set of beams during transmission of the synchronization signals and reception of the RACH signal for flexibility. For example, an array gain of base station 105-*a* may differ between downlink transmission and uplink reception and the directional synchronization signal received by UE 115-*a* may not accurately indicate a transmission power for transmitting on the uplink to base station 105-*a* over communication link 210. In some cases, the difference between downlink transmission and uplink reception may be based on a number of beams 205 base station 105-*a* uses to cover coverage area 110-*a*, or may be based on properties of transmission or reception chains of base station 105-*a* (e.g., a number of bits used in a phase quantizer, a phase difference between the transmission and reception chains, etc.). In some cases, base station 105-*a* may transmit characteristics of the array gain or signal strength. For example, base station 105-*a* may transmit to UE 115-*a* an indication of a range for a maximum difference in array gain between downlink transmission and uplink reception, an average difference in array gain, a maximum signal strength difference between any beam of the transmission beams and a corresponding beam of the reception beams, an average signal strength difference between any beam of the transmission beams and a corresponding beam of the reception beams, or any combinations thereof. Base station 105-*a* may store the indication of the range in the MIB, SIB, minimum SIB, or other type of SIB.

UE 115-*a* may select a path loss based on the path loss estimate and the maximum difference in array gain between downlink transmission and uplink reception for base station 105-*a*. Similarly to above, UE 115-*a* may estimate a path loss based on a received directional synchronization signal from base station 105-*a*. In some cases, UE 115-*a* may select a path loss based on the path loss estimate. In other cases, UE 115-*a* may select the path loss based on adjusting the path loss estimate. For example, in some cases, UE 115-*a* may implement a conservative approach. UE 115-*a* may select the path loss to equal the path loss estimate less a designated value. The designated value may be the maximum difference in array gain between downlink transmission and uplink reception for base station 105-*a*. A conservative approach may limit interference by the directional RACH request message to transmissions of other UEs 115. In other cases, UE 115-*a* may implement an aggressive approach in which the UE 115-*a* may select the path loss to equal the path loss estimate plus the designated value. The aggressive approach may increase a probability of other UEs 115 detecting the directional RACH request message.

Figure 3:
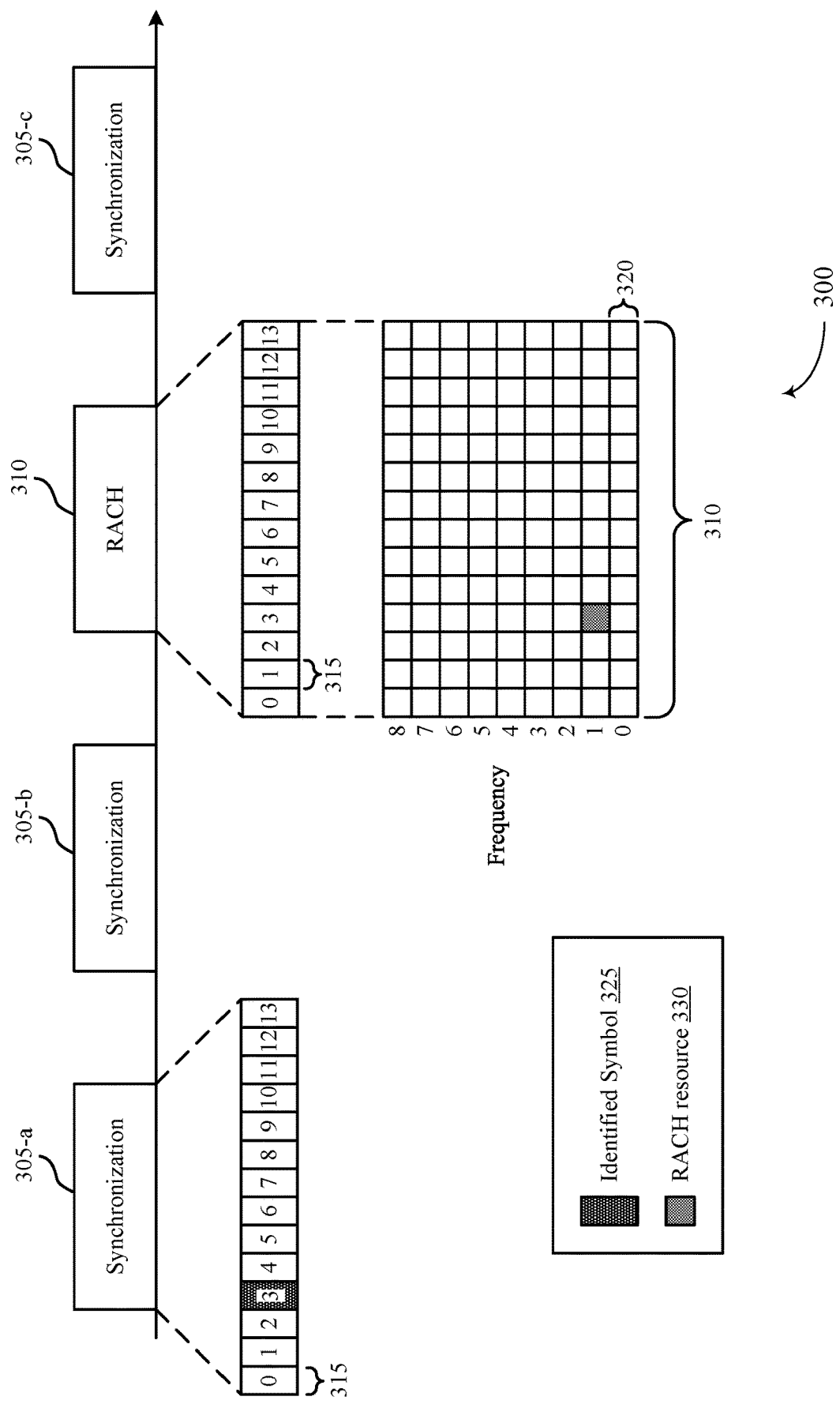
FIG. 3 illustrates an example of synchronization resources that supports uplink transmission parameter selection for a random access initial message in accordance with aspects of the present disclosure.

FIG. 3 illustrates an example of a synchronization procedure 300 for uplink transmission parameter selection for a random access initial message in accordance with various aspects of the present disclosure. The synchronization procedure 300 may include synchronization subframes 305 (e.g., synchronization subframes 305-*a*, 305-*b*, and 305-*c*) and RACH subframes 310. Both types of subframes may consist of one or more symbols 315. The synchronization procedure 300 may be performed by a UE 115 receiving signals from a base station 105, such as the corresponding devices described with reference to FIGS. 1 and 2.

In some cases, the base station 105 may transmit multiple directional synchronization signals during synchronization subframe 305-*a*. For example, the base station 105 may transmit a directional synchronization signal during each symbol 315-*a* of synchronization subframe 305-*a*. Each directional synchronization signal may be transmitted over a different beam in a different direction. For example, synchronization subframe 305-*a* may contain fourteen symbols 315. In one aspect, the base station 105 may divide a coverage area (or a portion of a coverage area) into fourteen sections and transmit directional synchronization signals on separate beams pointing in each section.

The UE 115 may receive one or more directional synchronization signals from the base station 105, and may select one of the multiple directional synchronization signals. For example, the UE 115 may select the directional synchronization signal with the greatest received signal strength (e.g., RSSI, RSRP, CQI, etc.). The UE 115 may identify the symbol (e.g., symbol 325) and the corresponding beam over which the UE 115 received the selected directional synchronization signal. In some cases, the UE 115 may randomly select a subcarrier region from the subcarrier frequencies 320. The UE 115 may transmit a directional RACH request message to the base station 105 in RACH resource 330, during the identified symbol 325 and over the selected subcarrier region.

The base station 105 may receive the directional RACH request message during the RACH subframe 310. In response, the base station 105 may transmit a directional RACH response message to the UE 115. However, in some cases, the UE 115 may not receive a directional RACH response message following its transmission. In one example, the base station 105 may not have received the directional RACH request message. In another example, the directional RACH request message or the directional RACH response message may have been interfered with. The UE 115 may retransmit the directional RACH request message to the base station 105. However, the UE 115 may select different parameters for the retransmission. For example, the UE 115 may select a different symbol 315-*b*, a different subcarrier frequency 320, or a combination of the two in order to retransmit the directional RACH message. For example, the UE 115 may have received a second directional synchronization signal during a different symbol than symbol 325. The UE 115 may select the different symbol, and the corresponding different beam, to retransmit the directional RACH request message to the base station 105.

Figure 4:
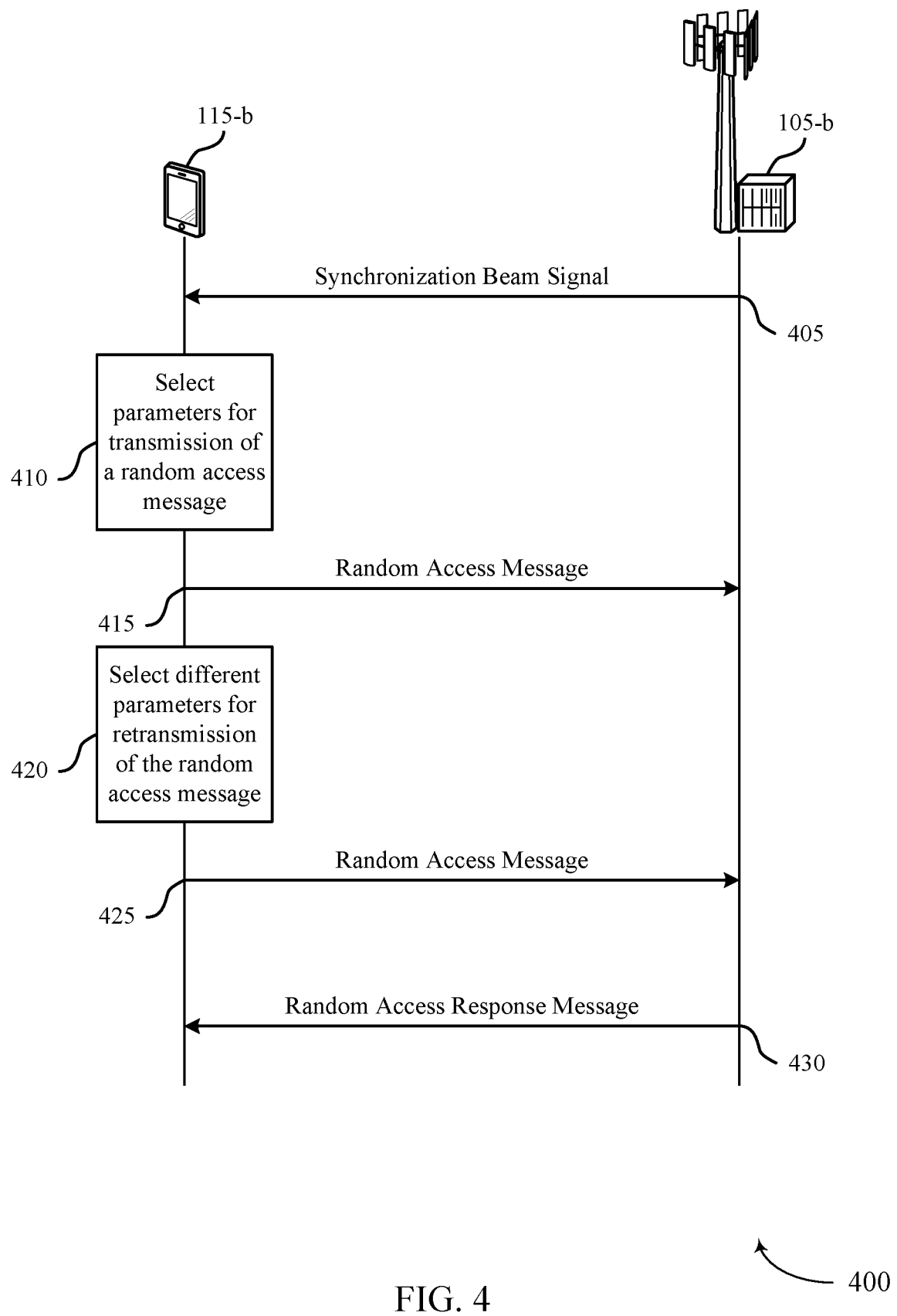
FIG. 4 illustrates an example of a process flow that supports uplink transmission parameter selection for a random access initial message in accordance with aspects of the present disclosure.

FIG. 4 illustrates an example of a process flow 400 for uplink transmission parameter selection for a random access initial message in accordance with various aspects of the present disclosure. UE 115-*b* and base station 105-*b* may be respective examples of a UE 115 and a base station 105 as described with reference to FIGS. 1 and 2.

At step 405, base station 105-*b* may transmit a synchronization beam signal. UE 115-*b* may receive the synchronization beam signal. In some cases, UE 115-*b* may also receive a maximum retransmission number from base station 105-*b*.

At step 410, UE 115-*b* may select parameters for transmission of a random access message. For example, UE 115-*b* may identify a first uplink transmission beam, a first random access resource, or both for a random access procedure. Additionally, UE 115-*b* may identify a first uplink transmission power for the random access procedure. For example, the uplink transmission power may be based on a power ramping counter. In some cases, the identifying may be based on the received synchronization beam signal.

At step 415, UE 115-*b* may transmit the random access message to base station 105-*b* using the first uplink transmission beam, the first uplink transmission power, and the first random access resource. UE 115-*b* may expect to receive a random access response message from base station 105-*b* in response to the random access message.

At step 420, UE 115-*b* may select different parameters for retransmission of the random access message. For example, UE 115-*b* may select a second uplink transmission beam, which may or may not be different from the first uplink transmission beam, or may select a second random access resource, which may or may not be different from the first random access resource. Additionally, UE 115-*b* may determine a second uplink transmission power for retransmission. For example, the second uplink transmission power may be based on the power ramping counter. The power ramping counter value may increment by one for each retransmission. In some cases, the power ramping counter value may not increment for retransmissions using a different uplink transmission beam, random access resource, or both. In some examples, UE 115-*b* may select a second random access resource or second uplink transmission beam corresponding to a lowest second uplink transmission power. In some cases, UE 115-b may determine a path loss associated with transmission of the random access message, and may determine the second uplink transmission power and the second random access resource based on the path loss. For example, the second uplink transmission power and the second random access resource may be further based on a difference between the path loss and a retransmission path loss of the random access message. In some cases, the second uplink transmission power and the second random access resource may be based on a retransmission number of the random access message, or on a delta function corresponding to the retransmission number. In some cases, the retransmission may be based on the received maximum retransmission number.

At step 425, UE 115-b may retransmit the random access message to base station 105-b using the second uplink transmission beam, the second uplink transmission power, the second random access resource, or a combination of the three.

In some cases, UE 115-b may not receive a random access response message from base station 105-b following retransmission. In these cases, UE 115-b may repeat the selection and retransmission process until UE 115-b receives a random access response message or until UE 115-b reaches the maximum retransmission number set by base station 105-b.

In other cases, base station 105-b may receive the random access message from UE 115-b at step 425. At step 430, base station 105-b may transmit a random access response message to UE 115-b. UE 115-b may receive the random access response message, and may gain access to the medium (e.g., following completion of a full RACH procedure).

Figure 5:
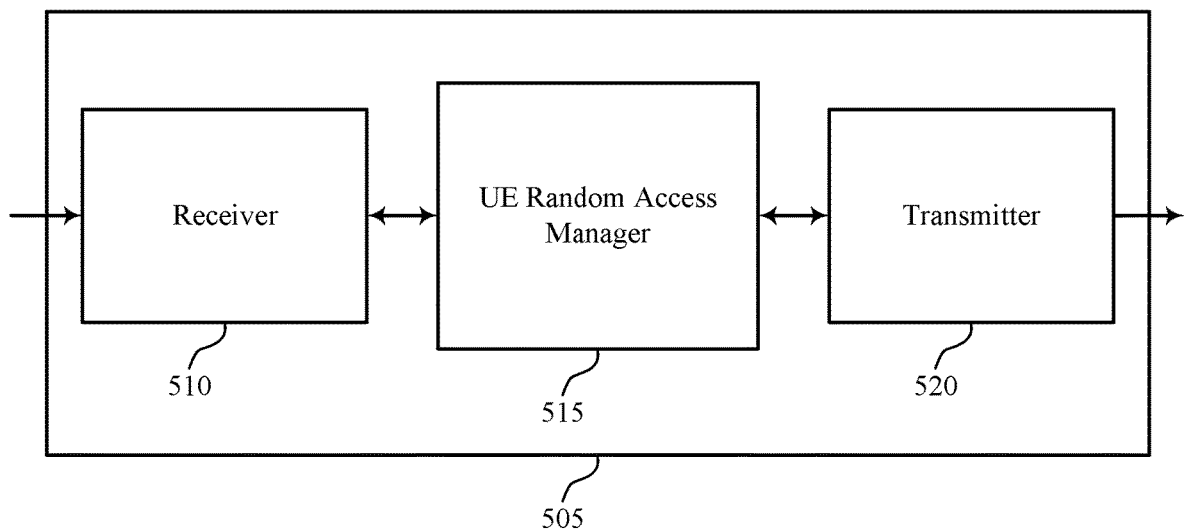
FIGS. 5 through 7 show block diagrams of a device that supports uplink transmission parameter selection for a random access initial message in accordance with aspects of the present disclosure.

FIG. 5 shows a block diagram 500 of a wireless device 505 that supports uplink transmission parameter selection for a random access initial message in accordance with various aspects of the present disclosure. Wireless device 505 may be an example of aspects of a UE 115 as described with reference to FIGS. 1, 2, and 4. Wireless device 505 may include receiver 510, UE random access manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to uplink transmission parameter selection for random access initial message, etc.). Information may be passed on to other components of the device. The receiver 510 may be an example of aspects of the transceiver 835 described with reference to FIG. 8.

UE random access manager 515 and/or at least some of its various sub-components may be implemented in hardware, software executed by a processor, firmware, or any combination thereof. If implemented in software executed by a processor, the functions of the UE random access manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE random access manager 515 and/or at least some of its various sub-components may be physically located at various positions, including being distributed such that portions of functions are implemented at different physical locations by one or more physical devices. In some examples, UE random access manager 515 and/or at least some of its various sub-components may be separate and distinct components in accordance with various aspects of the present disclosure. In other examples, UE random access manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE random access manager 515 may be an example of aspects of the UE random access manager 815 described with reference to FIG. 8.

UE random access manager 515 may identify a first uplink transmission beam for a random access procedure and, transmit, to a base station, a random access message using the first uplink transmission beam. The UE random access manager 515 may select a second uplink transmission beam based on an absence of a random access response from the base station corresponding to the random access message transmitted using the first uplink transmission beam, determine an uplink transmission power based at least in part on the selection of the second uplink transmission beam, and retransmit the random access message to the base station using the second uplink transmission beam.

Additionally or alternatively, UE random access manager 515 may identify a first random access resource for a random access procedure and, transmit, to a base station, a random access message using the first random access resource. The UE random access manager 515 may select a second random access resource based on an absence of a random access response from the base station corresponding to the random access message transmitted using the first random access resource, determine an uplink transmission power based at least in part on the selection of the second random access resource, and retransmit the random access message to the base station using the second random access resource.

The UE random access manager 515 may also receive, via a first set of beams of a base station, multiple downlink synchronization signals, transmit, to a second set of beams of the base station, a RACH signal based on the multiple downlink synchronization signals, and receive, from the base station, characteristics of a difference in signal strength between the first set of beams and the second set of beams at different coverage angles.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
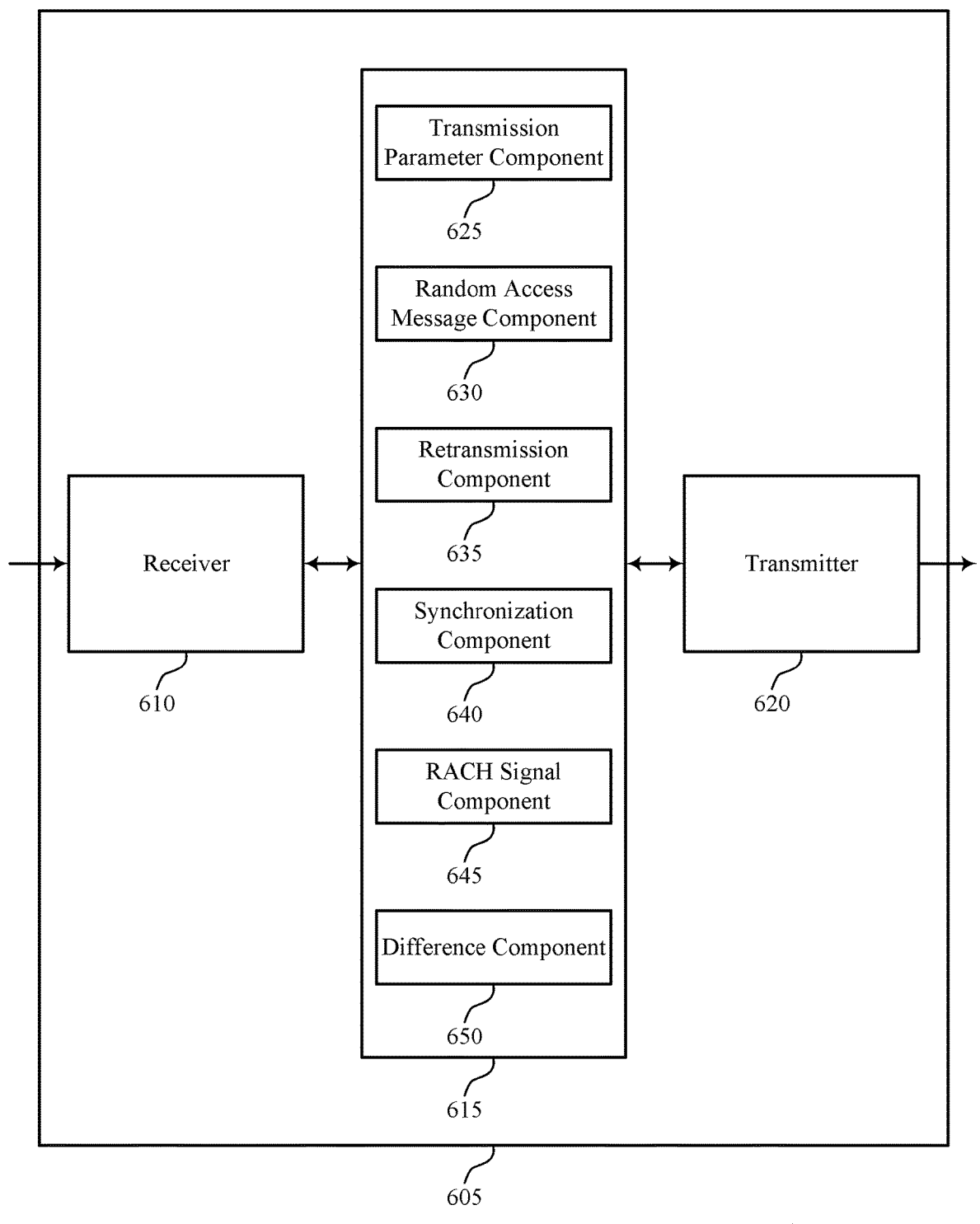

FIG. 6 shows a block diagram 600 of a wireless device 605 that supports uplink transmission parameter selection for a random access initial message in accordance with various aspects of the present disclosure. Wireless device 605 may be an example of aspects of a wireless device 505 or a UE 115 as described with reference to FIGS. 1, 2, 4, and 5. Wireless device 605 may include receiver 610, UE random access manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to uplink transmission parameter selection for random access initial message, etc.). Information may be passed on to other components of the device. The receiver 610 may be an example of aspects of the transceiver 835 described with reference to FIG. 8.

UE random access manager 615 may include transmission parameter component 625, random access message component 630, retransmission component 635, synchronization component 640, RACH signal component 645, and difference component 650. UE random access manager 615 may be an example of aspects of the UE random access manager 815 described with reference to FIG. 8.

Transmission parameter component 625 may identify a first uplink transmission beam for a random access procedure. Random access message component 630 may transmit, to a base station, a random access message using the first uplink transmission beam.

Transmission parameter component 625 may then select a second uplink transmission beam based on an absence of a random access response from the base station corresponding to the random access message transmitted using the first uplink transmission beam. Retransmission component 635 may determine an uplink transmission power based at least in part on the selection of the second uplink transmission beam, and may retransmit the random access message to the base station using the second uplink transmission beam and the determined uplink transmission power. In some cases, retransmission component 635 may retransmit the random access message according to a random access resource, or may retransmit a RACH signal based on the uplink transmission power.

In some cases, transmission parameter component 625 may identify a first random access resource for a random access procedure. Random access message component 630 may transmit, to a base station, a random access message using the first random access resource.

Transmission parameter component 625 may then select a second random access resource based on an absence of a random access response from the base station corresponding to the random access message transmitted using the first random access resource. Retransmission component 635 may determine an uplink transmission power based at least in part on the selection of the second random access resource, and may retransmit the random access message to the base station using the second random access resource and the determined uplink transmission power. In some cases, retransmission component 635 may retransmit the random access message according to an uplink transmission beam, or may retransmit a RACH signal based on the uplink transmission power.

Synchronization component 640 may receive, from the base station, multiple downlink synchronization signals. A first uplink transmission beam may be identified based on the synchronization signals. In some cases, synchronization component 640 may receive, via a first set of beams of the base station, the multiple downlink synchronization signals. In some cases, the synchronization signals include a PSS, an SSS, an ESS, a BRS, a PBCH, or any combinations thereof.

RACH signal component 645 may transmit, to a second set of beams of the base station, a RACH signal based on the multiple downlink synchronization signals.

Difference component 650 may receive, from the base station, characteristics of a difference in signal strength between the first set of beams and the second set of beams at different coverage angles. In some cases, the characteristics of the difference in signal strength include a maximum signal strength difference between any beam of the first set of beams and a corresponding beam of the second set of beams. In some cases, the characteristics of the difference in signal strength include an average signal strength difference between any beam of the first set of beams and a corresponding beam of the second set of beams.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
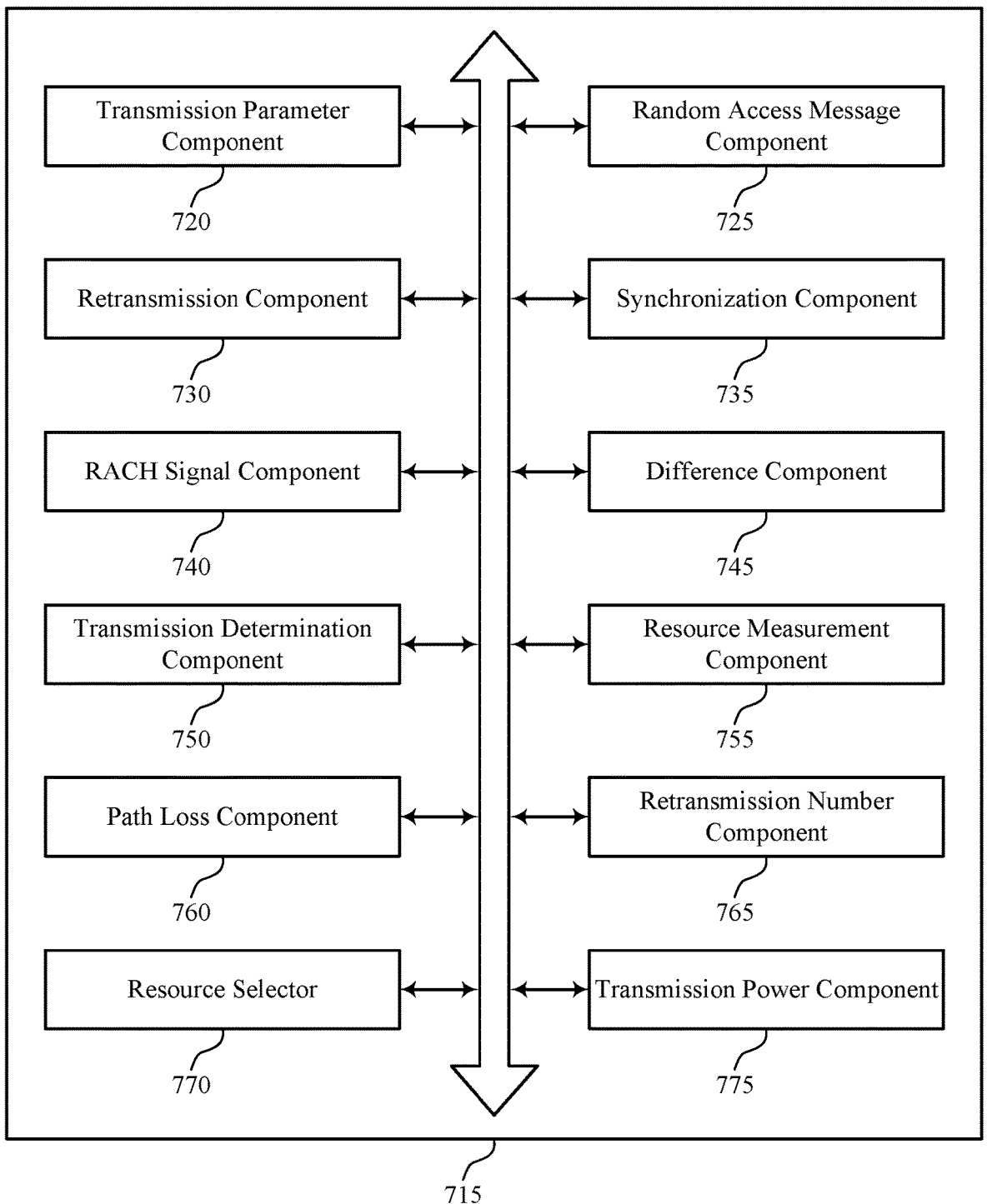

FIG. 7 shows a block diagram 700 of a UE random access manager 715 that supports uplink transmission parameter selection for a random access initial message in accordance with various aspects of the present disclosure. The UE random access manager 715 may be an example of aspects of a UE random access manager 515, a UE random access manager 615, or a UE random access manager 815 described with reference to FIGS. 5, 6, and 8. The UE random access manager 715 may include transmission parameter component 720, random access message component 725, retransmission component 730, synchronization component 735, RACH signal component 740, difference component 745, transmission determination component 750, resource measurement component 755, path loss component 760, retransmission number component 765, resource selector 770, and transmission power component 775. Each of these modules may communicate, directly or indirectly, with one another (e.g., via one or more buses).

Transmission parameter component 720 may identify a first uplink transmission beam for a random access procedure. Random access message component 725 may transmit, to a base station, a random access message using the first uplink transmission beam. In some cases, transmission parameter component 720 may select a second uplink transmission beam based on an absence of a random access response from the base station corresponding to the random access message transmitted using the first uplink transmission beam.

Retransmission component 730 may determine an uplink transmission power based on the selection of the second uplink transmission beam, and may retransmit the random access message to the base station using the second uplink transmission beam and the determined uplink transmission power. In some cases, retransmission component 730 may retransmit the random access message according to a random access resource, or may retransmit a RACH signal based on the uplink transmission power.

In some examples, the second uplink transmission beam may be the same as the first uplink transmission beam. In these examples, determining the uplink transmission power may involve determining a path loss associated with retransmission of the random access message using the second uplink transmission beam, where the uplink transmission power is based on the path loss. In some cases, determining the uplink transmission power may further involve increasing the uplink transmission power by an additional amount, where the additional amount is a function of a number of retransmissions. For example, the function of the number of retransmissions may be a function of a power ramping counter, where the power ramping counter is based on the number of retransmissions and a number of uplink transmission beam changes. In some cases, a value of the power ramping counter may be equal to the number of retransmissions minus the number of uplink transmission beam changes.

In other examples, the second uplink transmission beam may be different than the first uplink transmission beam. In these examples, determining the uplink transmission power may involve determining a path loss associated with retransmission of the random access message using the second uplink transmission beam, where the uplink transmission power is based on the determined path loss. In some cases, determining the uplink transmission power may further involve maintaining a same power ramping counter value, where the uplink transmission power is based on the same power ramping counter value. In some cases, determining the uplink transmission power may further involve increasing the uplink transmission power by an additional amount, where the additional amount is equal to a power ramped amount associated with transmission of the random access message using the first uplink transmission beam.

In some cases, transmission parameter component 720 may identify a first random access resource for a random access procedure. Random access message component 725 may transmit, to a base station, a random access message using the first random access resource. In some cases, transmission parameter component 720 may select a second random access resource based on an absence of a random access response from the base station corresponding to the random access message transmitted using the first random access resource. Transmission parameter component 720 may, in some cases, measure a quality of a downlink synchronization resource, and may select the second random access resource based on the quality of the downlink synchronization resource. The quality of the downlink synchronization resource may include at least one of a signal to noise ratio, a signal to interference plus noise ratio, a channel quality indication, a reference signal received power, a received signal strength indicator, or some combination of these parameters.

Retransmission component 730 may determine an uplink transmission power based on the selection of the second random access resource, and may retransmit the random access message to the base station using the second random access resource and the determined uplink transmission power. In some cases, retransmission component 730 may retransmit the random access message according to an uplink transmission beam, or may retransmit a RACH signal based on the uplink transmission power. In some cases, retransmission component 730 may determine a path loss associated with retransmission of the random access message using the second random access resource, where the uplink transmission power may be based on the determined path loss.

In some cases, the first and second random access resources may correspond to combinations of time-frequency resources and random access preambles. In some cases, the first and second random access resources may each correspond to synchronization signals or synchronization signal blocks of the base station.

In some cases, the first and second random access resources may be the same. In these cases, retransmission component 730 may increase the uplink transmission power by an additional amount based on a number of retransmissions. In other cases, the first and second random access resources may be different. In these cases, retransmission component 730 may maintain a same power ramping counter value based on the random access resources being different, where the uplink transmission power is based on the same power ramping counter value. In some cases, retransmission component 730 may increase the uplink transmission power by an additional amount, where the additional amount is equal to a power ramped amount associated with transmitting the random access message using the first random access resource.

Synchronization component 735 may receive, from a base station, multiple synchronization signals. A first uplink transmission beam may be identified based on the synchronization signals. In some cases, synchronization component 735 may receive, via a first set of beams of the base station, the multiple downlink synchronization signals. In some cases, the synchronization signals include a PSS, an SSS, an ESS, a BRS, a PBCH, or any combinations thereof.

RACH signal component 740 may transmit, to a second set of beams of the base station, a RACH signal based on the multiple downlink synchronization signals.

Difference component 745 may receive, from the base station, characteristics of a difference in signal strength between the first set of beams and the second set of beams at different coverage angles. In some cases, the characteristics of the difference in signal strength include a maximum signal strength difference between any beam of the first set of beams and a corresponding beam of the second set of beams. In some cases, the characteristics of the difference in signal strength include an average signal strength difference between any beam of the first set of beams and a corresponding beam of the second set of beams.

Transmission determination component 750 may determine a random access resource for retransmission of the random access message, which may be based on a retransmission number of the random access message. The transmission determination component 750 may determine the uplink transmission power based on a difference between the path loss estimated during transmission of the random access message and a path loss estimated during retransmission of the random access message. In some cases, the transmission determination component 750 may determine an uplink transmission power for retransmission of the random access message based on at least one of the synchronization signals. In some cases, the random access resource indicates one or more combinations of time and frequency. In some cases, the uplink transmission power is determined to be the same as an initial uplink transmission power if the difference is below a path loss threshold. In some cases, the uplink transmission power is determined to be greater than the initial uplink transmission power is above the path loss threshold.

Resource measurement component 755 may measure a quality of a downlink synchronization resource, where determining the random access resource for retransmission is based on the quality of the downlink synchronization resource. In some cases, the quality of the downlink synchronization resource includes at least one of a signal to noise ratio, a signal to interference plus noise ratio, a channel quality indication, a reference signal received power, a received signal strength indicator, or any combinations thereof.

Path loss component 760 may determine a path loss associated with the random access resource for retransmission of the random access message, where the uplink transmission power is based on the path loss. In some examples, the random access resource for retransmission may be the same as a prior random access resource for transmission of the random access resource using the first uplink transmission beam. In some cases, path loss component 760 may determine the uplink transmission power by increasing the uplink transmission power by an additional amount based on a number of retransmissions. In other examples, the random access resource for retransmission may be different than a prior random access resource for transmission of the random access resource using the first uplink transmission beam. In some cases, path loss component 760 may determine the uplink transmission power by increasing the uplink transmission power by an additional amount, where the additional amount is equal to a power ramped amount associated with transmission of the random access message using the prior random access resource. In some cases, path loss component 760 may determine a path loss associated with at least one of the synchronization signals, where the uplink transmission power is determined based on the path loss, and determine a path loss based on the characteristics of the difference in signal strength.

Retransmission number component 765 may receive, from the base station, a maximum retransmission number, where retransmitting the random access message is based on the maximum retransmission number. In some cases, the maximum retransmission number is associated with at least one of a total number of retransmission attempts of the random access message, a number of retransmission attempts of the random access message for each of a set of uplink transmission powers, a number of retransmission attempts of the random access message for each of a set of random access resources, or a number of retransmission attempts of the random access message for each combination of uplink transmission powers and random access resources.

Resource selector 770 may select a random access resource for retransmission of the random access message, the random access resource corresponding to a lowest uplink transmission power and select a random access resource for retransmission of the random access message based on a difference between the first transmission power and the second transmission power.

Transmission power component 775 may determine a first transmission power for a first random access resource, determine a second transmission power for a second random access resource, and determine an uplink transmission power for transmission of the RACH signal based on the path loss.

Figure 8:
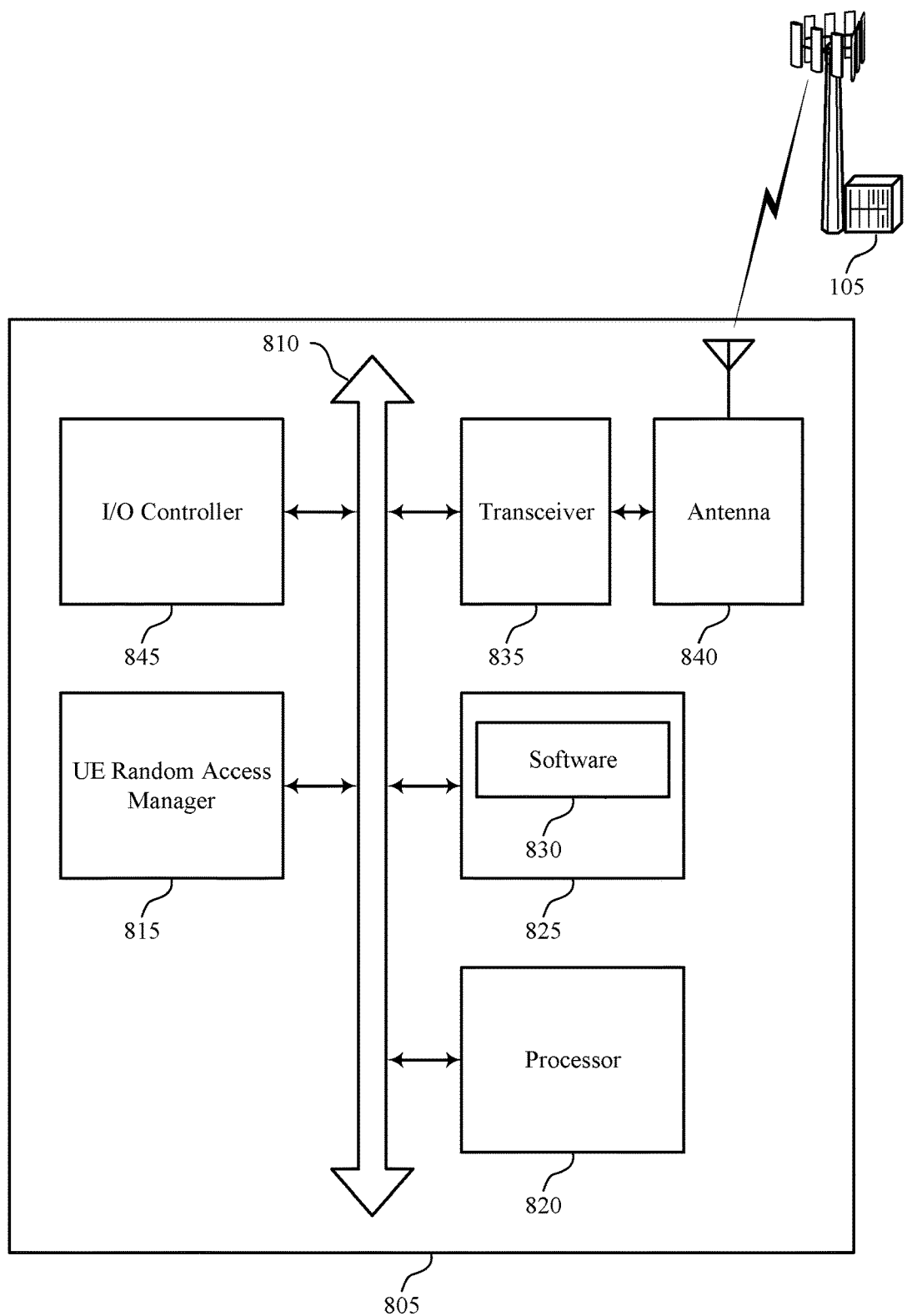
FIG. 8 illustrates a block diagram of a system including a user equipment (UE) that supports uplink transmission parameter selection for a random access initial message in accordance with aspects of the present disclosure.

FIG. 8 shows a diagram of a system 800 including a device 805 that supports uplink transmission parameter selection for a random access initial message in accordance with various aspects of the present disclosure. Device 805 may be an example of or include the components of wireless device 505, wireless device 605, or a UE 115 as described above, e.g., with reference to FIGS. 1, 2, 4, 5 and 6. Device 805 may include components for bi-directional voice and data communications including components for transmitting and receiving communications, including UE random access manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting uplink transmission parameter selection for random access initial message).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support uplink transmission parameter selection for random access initial messages. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
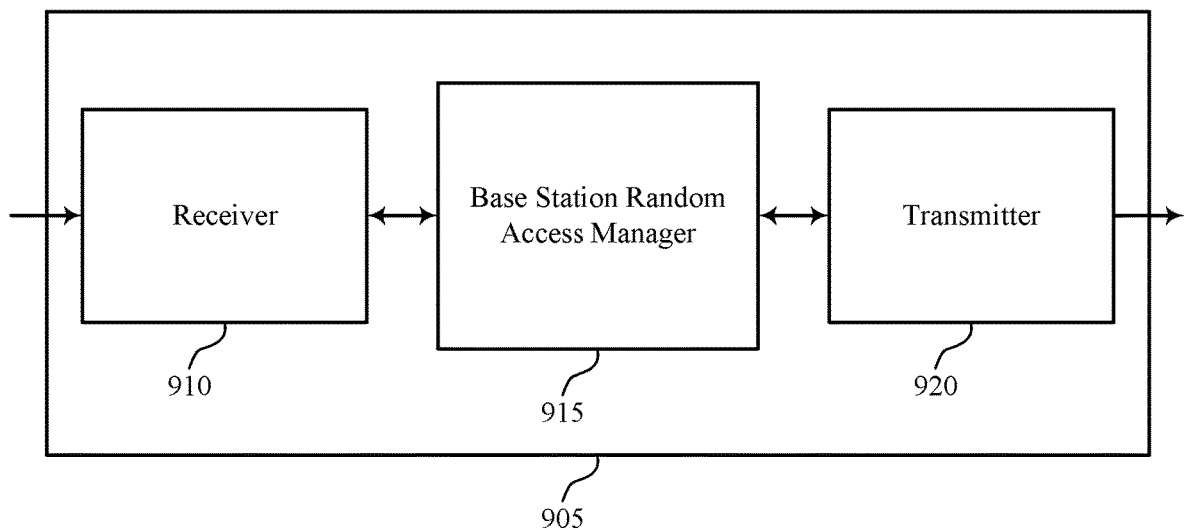
FIGS. 9 through 11 show block diagrams of a device that supports uplink transmission parameter selection for a random access initial message in accordance with aspects of the present disclosure.

FIG. 9 shows a block diagram 900 of a wireless device 905 that supports uplink transmission parameter selection for a random access initial message in accordance with various aspects of the present disclosure. Wireless device 905 may be an example of aspects of a base station 105 as described with reference to FIGS. 1, 2, and 4. Wireless device 905 may include receiver 910, base station random access manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to uplink transmission parameter selection for random access initial message, etc.). Information may be passed on to other components of the device.

The receiver 910 may be an example of aspects of the transceiver 1235 described with reference to FIG. 12.

Base station random access manager 915 may be an example of aspects of the base station random access manager 1215 described with reference to FIG. 12. Base station random access manager 915 and/or at least some of its various sub-components may be implemented in hardware, software executed by a processor, firmware, or any combination thereof. If implemented in software executed by a processor, the functions of the base station random access manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station random access manager 915 and/or at least some of its various sub-components may be physically located at various positions, including being distributed such that portions of functions are implemented at different physical locations by one or more physical devices. In some examples, base station random access manager 915 and/or at least some of its various sub-components may be a separate and distinct component in accordance with various aspects of the present disclosure. In other examples, base station random access manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station random access manager 915 may transmit, using a first set of beams, multiple downlink synchronization signals, receive, using a second set of beams, uplink RACH signals from one or more wireless devices, and transmit, to the one or more wireless devices, characteristics of a difference in signal strength between the first set of beams and the second set of beams at different coverage angles.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
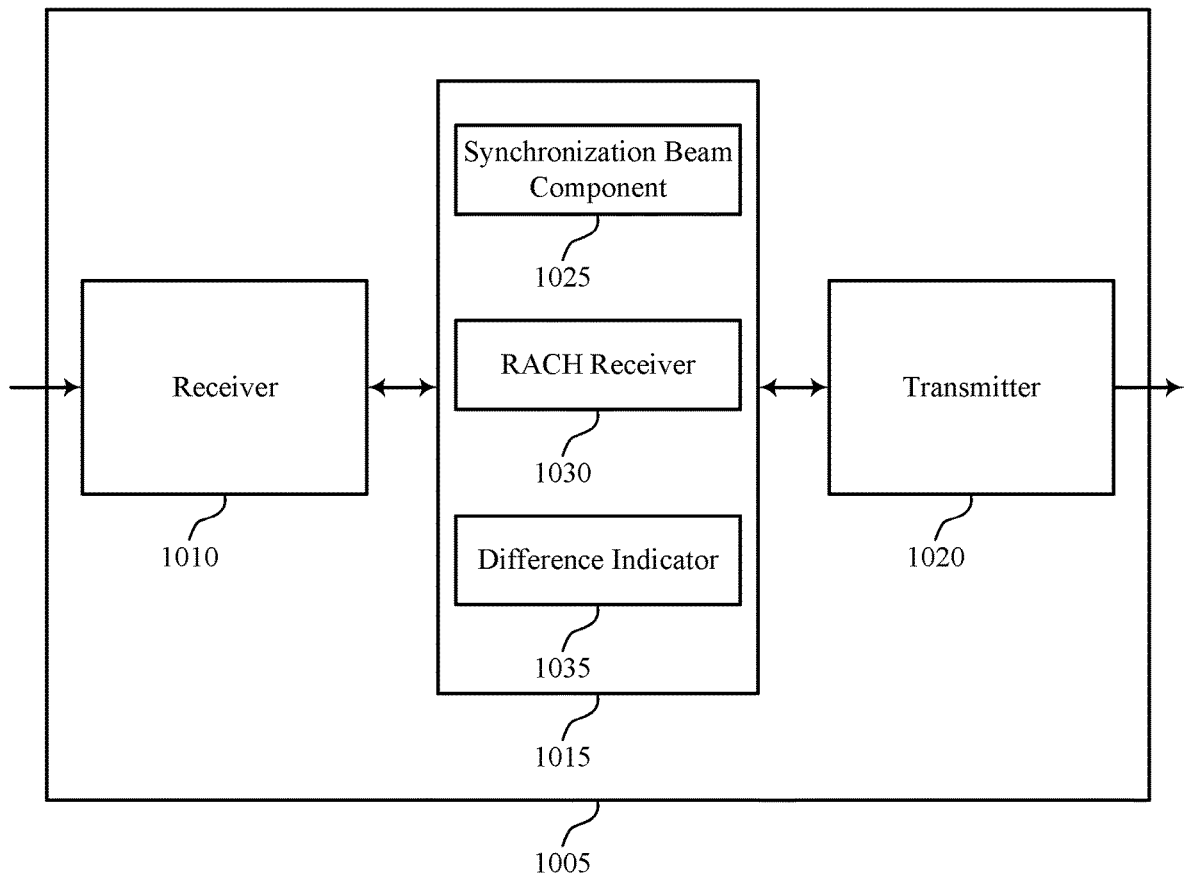

FIG. 10 shows a block diagram 1000 of a wireless device 1005 that supports uplink transmission parameter selection for a random access initial message in accordance with various aspects of the present disclosure. Wireless device 1005 may be an example of aspects of a wireless device 905 or a base station 105 as described with reference to FIGS. 1, 2, 4, and 9. Wireless device 1005 may include receiver 1010, base station random access manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink transmission parameter selection for random access initial message, etc.). Information may be passed on to other components of the device. The receiver 1010 may be an example of aspects of the transceiver 1235 described with reference to FIG. 12.

Base station random access manager 1015 may be an example of aspects of the base station random access manager 1215 described with reference to FIG. 12. Base station random access manager 1015 may also include synchronization beam component 1025, RACH receiver 1030, and difference indicator 1035.

Synchronization beam component 1025 may transmit, using a first set of beams, multiple downlink synchronization signals. RACH receiver 1030 may receive, using a second set of beams, uplink RACH signals from one or more wireless devices.

Difference indicator 1035 may transmit, to the one or more wireless devices, characteristics of a difference in signal strength between the first set of beams and the second set of beams at different coverage angles. In some cases, the characteristics of the difference in signal strength include a maximum signal strength difference between any beam of the first set of beams and a corresponding beam of the second set of beams. In some cases, the characteristics of the difference in signal strength include an average signal strength difference between any beam of the first set of beams and a corresponding beam of the second set of beams. In some cases, the difference in signal strength is determined based on a number of beams in the first set of beams and a number of beams in the second set of beams. In some cases, the characteristics are conveyed via a master information block, a system information block, a PBCH, an ePBCH, a PDSCH, a physical downlink control channel (PDCCH), or any combination thereof.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
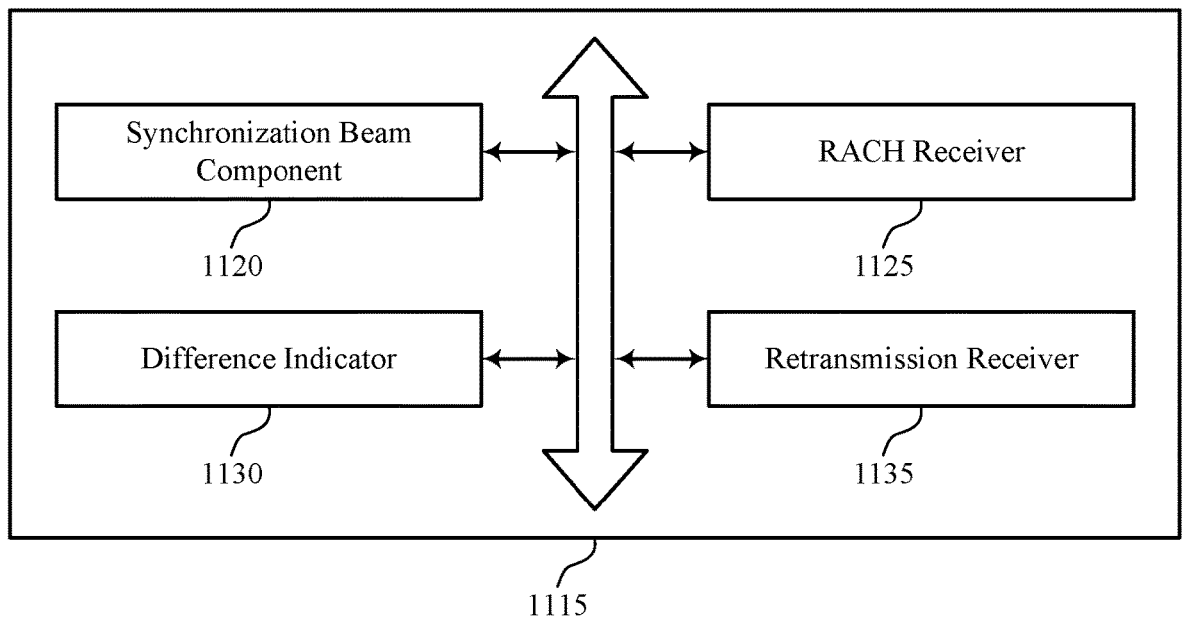

FIG. 11 shows a block diagram 1100 of a base station random access manager 1115 that supports uplink transmission parameter selection for a random access initial message in accordance with various aspects of the present disclosure. The base station random access manager 1115 may be an example of aspects of a base station random access manager 915, 1015, or 1215 described with reference to FIGS. 9, 10, and 12. The base station random access manager 1115 may include synchronization beam component 1120, RACH receiver 1125, difference indicator 1130, and retransmission receiver 1135. Each of these modules may communicate, directly or indirectly, with one another (e.g., via one or more buses).

Synchronization beam component 1120 may transmit, using a first set of beams, multiple downlink synchronization signals. RACH receiver 1125 may receive, using a second set of beams, uplink RACH signals from one or more wireless devices.

Difference indicator 1130 may transmit, to the one or more wireless devices, characteristics of a difference in signal strength between the first set of beams and the second set of beams at different coverage angles. In some cases, the characteristics of the difference in signal strength include a maximum signal strength difference between any beam of the first set of beams and a corresponding beam of the second set of beams. In some cases, the characteristics of the difference in signal strength include an average signal strength difference between any beam of the first set of beams and a corresponding beam of the second set of beams. In some cases, the difference in signal strength is determined based on a number of beams in the first set of beams and a number of beams in the second set of beams. In some cases, the characteristics are conveyed via a master information block, a system information block, a PBCH, an ePBCH, a PDSCH, a PDCCH, or any combination thereof.

Retransmission receiver 1135 may receive a retransmission of an uplink RACH signal from a wireless device, where the retransmission is received at a power level different from an initial transmission of the uplink RACH signal from the wireless device.

Figure 12:
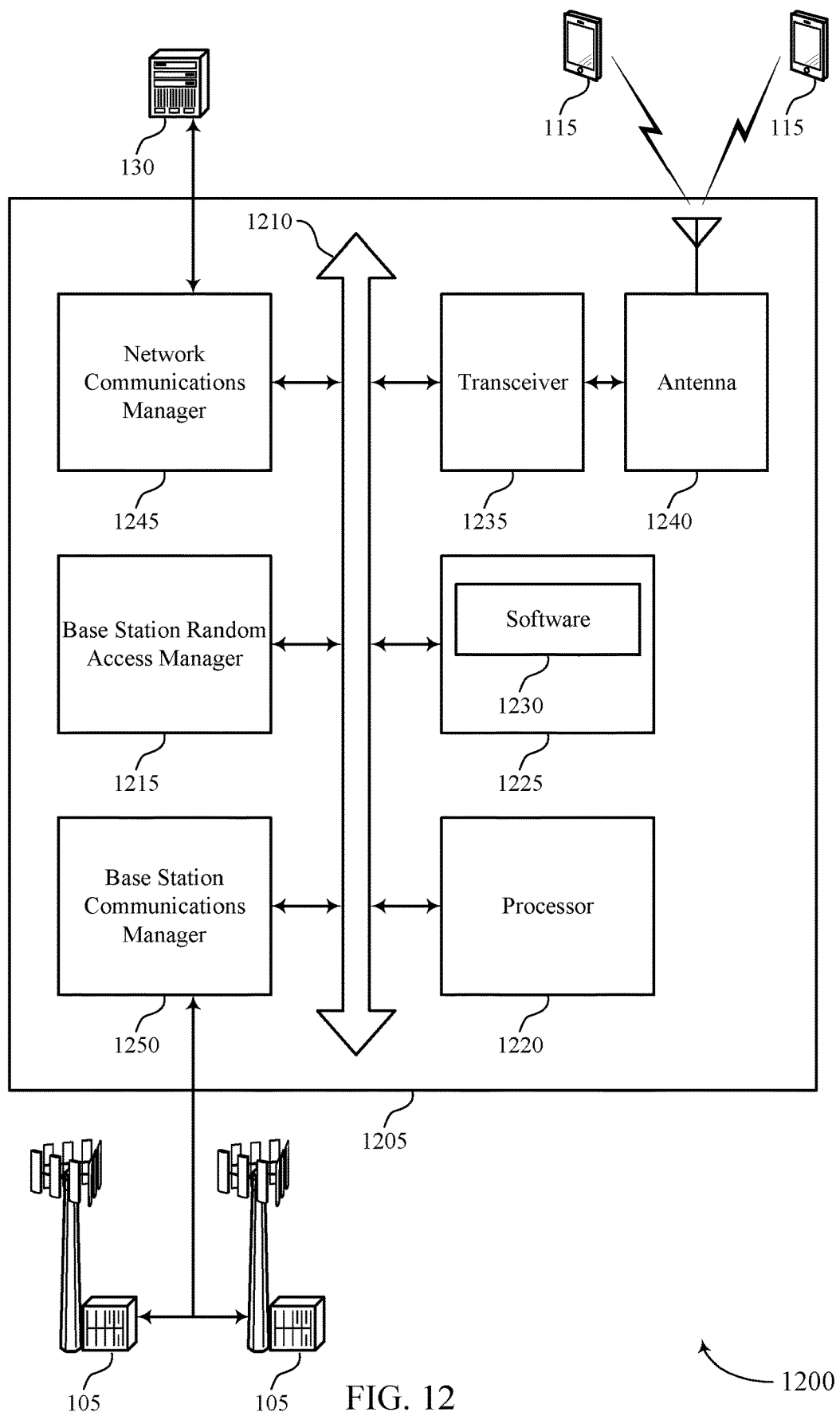
FIG. 12 illustrates a block diagram of a system including a base station that supports uplink transmission parameter selection for a random access initial message in accordance with aspects of the present disclosure.

FIG. 12 shows a diagram of a system 1200 including a device 1205 that supports uplink transmission parameter selection for a random access initial message in accordance with various aspects of the present disclosure. Device 1205 may be an example of or include the components of a base station 105 as described above, e.g., with reference to FIGS. 1, 2, and 4. Device 1205 may include components for bi-directional voice and data communications including components for transmitting and receiving communications, including base station random access manager 1215, processor 1220, memory 1225, software 1230, transceiver 1235, antenna 1240, network communications manager 1245, and base station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting uplink transmission parameter selection for random access initial messages).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support uplink transmission parameter selection for random access initial messages. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
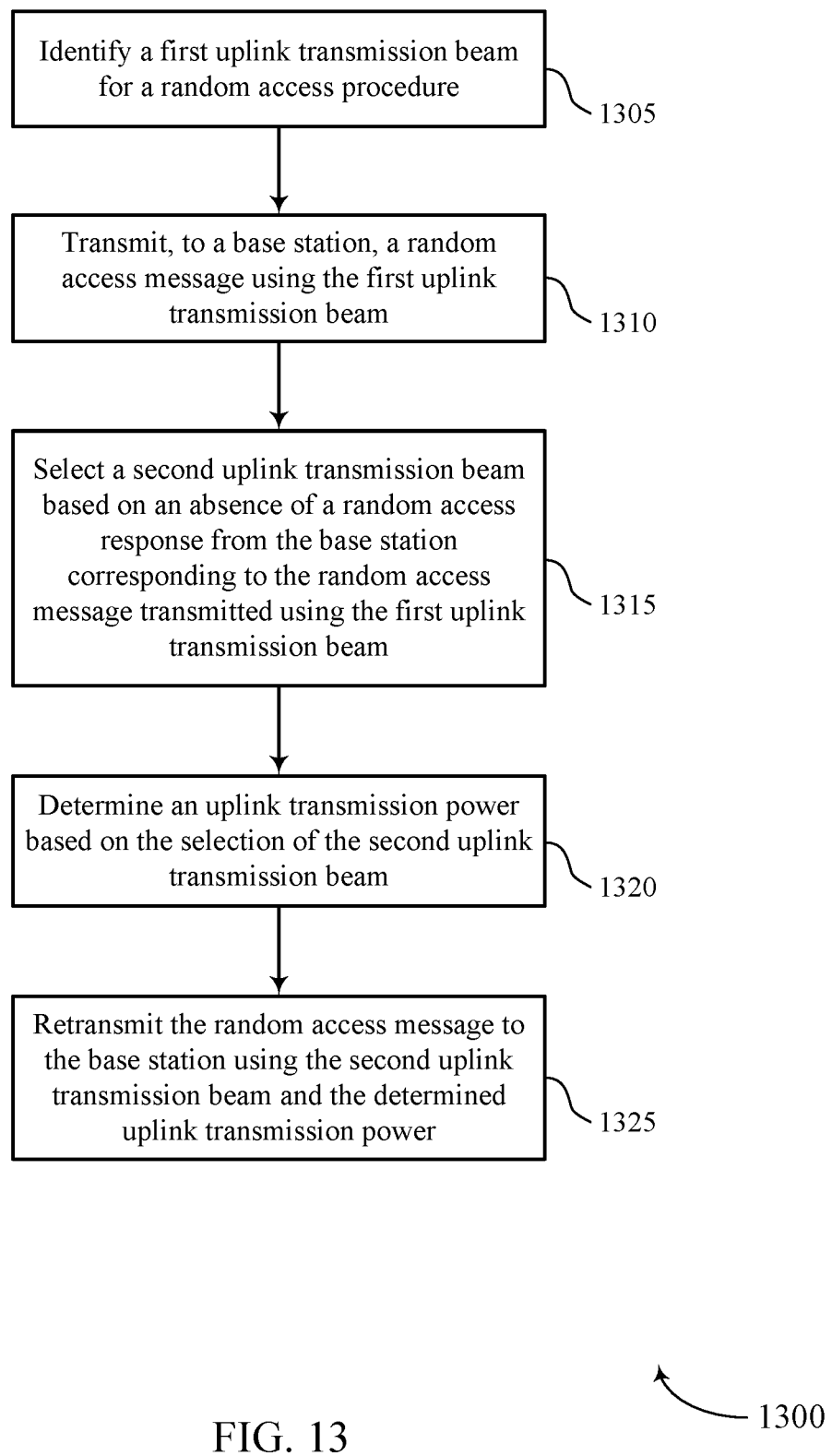
FIGS. 13 through 16 illustrate methods for uplink transmission parameter selection for a random access initial message in accordance with aspects of the present disclosure.

FIG. 13 shows a flowchart illustrating a method 1300 for uplink transmission parameter selection for a random access initial message in accordance with various aspects of the present disclosure. The operations of method 1300 may be implemented by a UE 115 or its components as described herein. For example, the operations of method 1300 may be performed by a UE random access manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a first uplink transmission beam for a random access procedure. The operations of block 1305 may be performed according to the methods described with reference to FIGS. 1 through 4. In certain examples, aspects of the operations of block 1305 may be performed by a transmission beam component as described with reference to FIGS. 5 through 8.

At block 1310 the UE 115 may transmit, to a base station, a random access message using the first uplink transmission beam. The operations of block 1310 may be performed according to the methods described with reference to FIGS. 1 through 4. In certain examples, aspects of the operations of block 1310 may be performed by a random access message component as described with reference to FIGS. 5 through 8.

At block 1315 the UE 115 may select a second uplink transmission beam based at least in part on an absence of a random access response from the base station corresponding to the random access message transmitted using the first uplink transmission beam. The operations of block 1315 may be performed according to the methods described with reference to FIGS. 1 through 4. In certain examples, aspects of the operations of block 1315 may be performed by a transmission beam component as described with reference to FIGS. 5 through 8.

At block 1320 the UE 115 may determine an uplink transmission power based at least in part on the selection of the second uplink transmission beam. The operations of block 1320 may be performed according to the methods described with reference to FIGS. 1 through 4. In certain examples, aspects of the operations of block 1320 may be performed by a retransmission component as described with reference to FIGS. 5 through 8.

At block 1325 the UE 115 may retransmit the random access message to the base station using the second uplink transmission beam and the determined uplink transmission power. The operations of block 1325 may be performed according to the methods described with reference to FIGS. 1 through 4. In certain examples, aspects of the operations of block 1325 may be performed by a retransmission component as described with reference to FIGS. 5 through 8.

Figure 14:
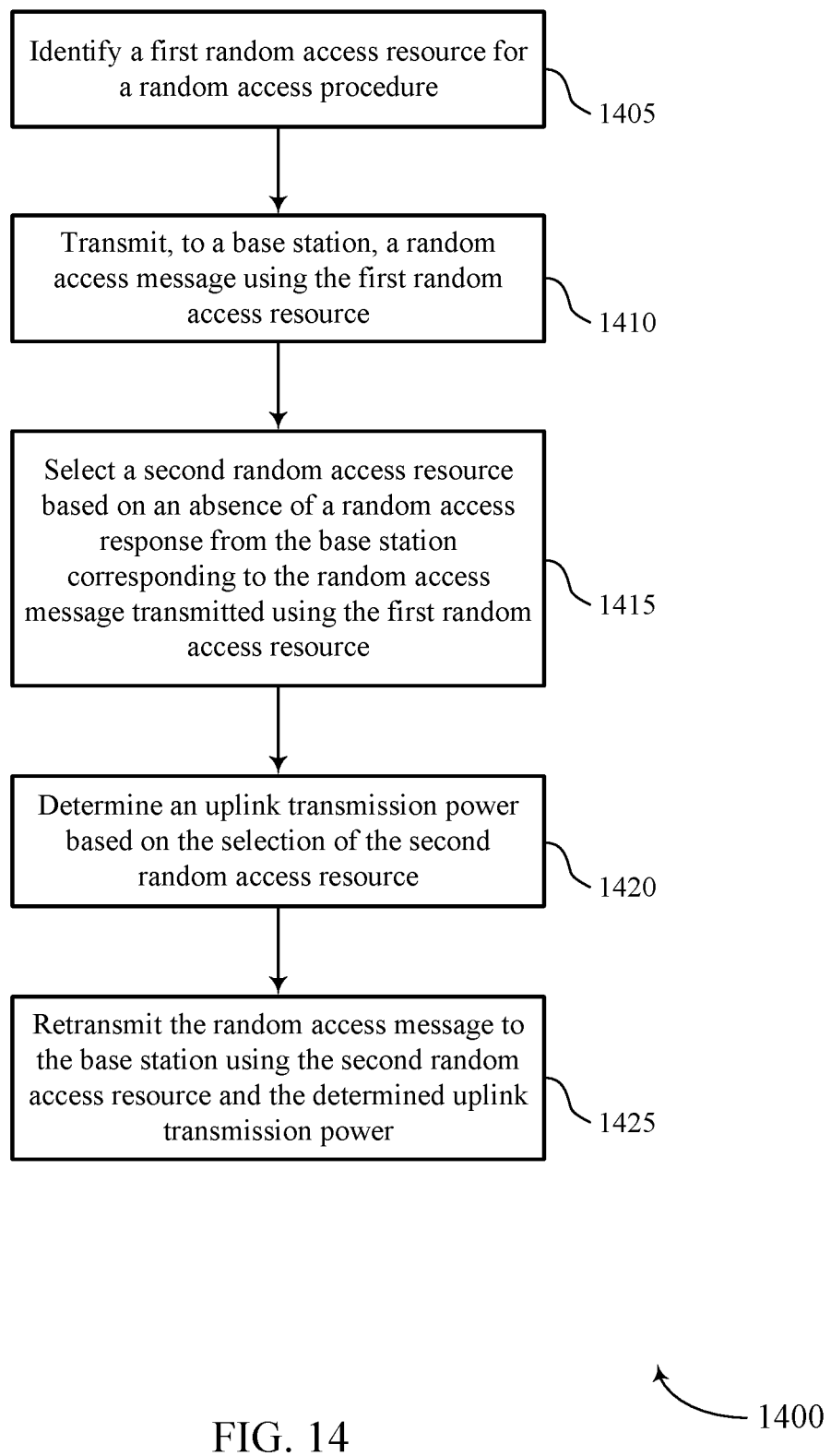

FIG. 14 shows a flowchart illustrating a method 1400 for uplink transmission parameter selection for a random access initial message in accordance with various aspects of the present disclosure. The operations of method 1400 may be implemented by a UE 115 or its components as described herein. For example, the operations of method 1400 may be performed by a UE random access manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify a first random access resource for a random access procedure. The operations of block 1405 may be performed according to the methods described with reference to FIGS. 1 through 4. In certain examples, aspects of the operations of block 1405 may be performed by a transmission beam component as described with reference to FIGS. 5 through 8.

At block 1410 the UE 115 may transmit, to a base station, a random access message using the first random access resource. The operations of block 1410 may be performed according to the methods described with reference to FIGS. 1 through 4. In certain examples, aspects of the operations of block 1410 may be performed by a random access message component as described with reference to FIGS. 5 through 8.

At block 1415 the UE 115 may select a second random access resource based at least in part on an absence of a random access response from the base station corresponding to the random access message transmitted using the first random access resource. The operations of block 1415 may be performed according to the methods described with reference to FIGS. 1 through 4. In certain examples, aspects of the operations of block 1415 may be performed by a transmission beam component as described with reference to FIGS. 5 through 8.

At block 1420 the UE 115 may determine an uplink transmission power based at least in part on the selection of the second random access resource. The operations of block 1420 may be performed according to the methods described with reference to FIGS. 1 through 4. In certain examples, aspects of the operations of block 1420 may be performed by a retransmission component as described with reference to FIGS. 5 through 8.

At block 1425 the UE 115 may retransmit the random access message to the base station using the second random access resource and the determined uplink transmission power. The operations of block 1425 may be performed according to the methods described with reference to FIGS. 1 through 4. In certain examples, aspects of the operations of block 1425 may be performed by a retransmission component as described with reference to FIGS. 5 through 8.

Figure 15:
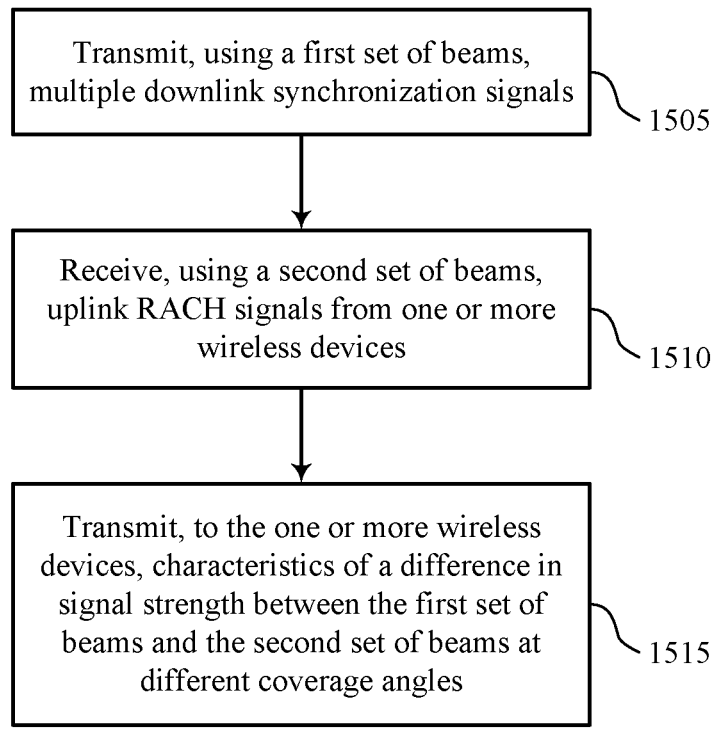

FIG. 15 shows a flowchart illustrating a method 1500 for uplink transmission parameter selection for a random access initial message in accordance with various aspects of the present disclosure. The operations of method 1500 may be implemented by a base station 105 or its components as described herein. For example, the operations of method 1500 may be performed by a base station random access manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit, using a first set of beams, multiple downlink synchronization signals. The operations of block 1505 may be performed according to the methods described with reference to FIGS. 1 through 4. In certain examples, aspects of the operations of block 1505 may be performed by a synchronization beam component as described with reference to FIGS. 9 through 12.

At block 1510 the base station 105 may receive, using a second set of beams, uplink RACH signals from one or more wireless devices. The operations of block 1510 may be performed according to the methods described with reference to FIGS. 1 through 4. In certain examples, aspects of the operations of block 1510 may be performed by a RACH receiver as described with reference to FIGS. 9 through 12.

At block 1515 the base station 105 may transmit, to the one or more wireless devices, characteristics of a difference in signal strength between the first set of beams and the second set of beams at different coverage angles. The operations of block 1515 may be performed according to the methods described with reference to FIGS. 1 through 4. In certain examples, aspects of the operations of block 1515 may be performed by a difference indicator as described with reference to FIGS. 9 through 12.

Figure 16:
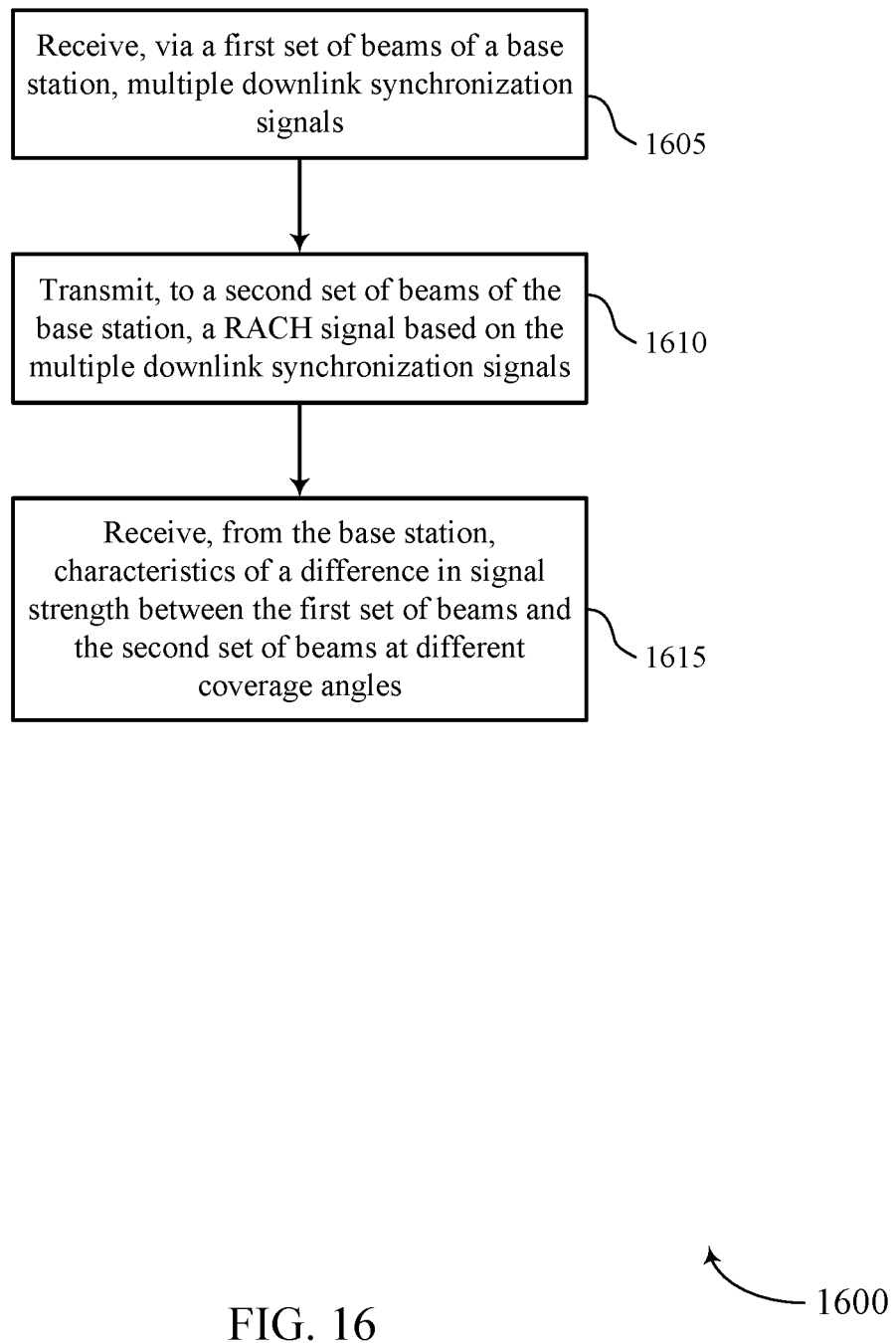

FIG. 16 shows a flowchart illustrating a method 1600 for uplink transmission parameter selection for a random access initial message in accordance with various aspects of the present disclosure. The operations of method 1600 may be implemented by a UE 115 or its components as described herein. For example, the operations of method 1600 may be performed by a UE random access manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, via a first set of beams of a base station, multiple downlink synchronization signals. The operations of block 1605 may be performed according to the methods described with reference to FIGS. 1 through 4. In certain examples, aspects of the operations of block 1605 may be performed by a synchronization component as described with reference to FIGS. 5 through 8.

At block 1610 the UE 115 may transmit, to a second set of beams of the base station, a RACH signal based at least in part on the multiple downlink synchronization signals. The operations of block 1610 may be performed according to the methods described with reference to FIGS. 1 through 4. In certain examples, aspects of the operations of block 1610 may be performed by a RACH signal component as described with reference to FIGS. 5 through 8.

At block 1615 the UE 115 may receive, from the base station, characteristics of a difference in signal strength between the first set of beams and the second set of beams at different coverage angles. The operations of block 1615 may be performed according to the methods described with reference to FIGS. 1 through 4. In certain examples, aspects of the operations of block 1615 may be performed by a difference component as described with reference to FIGS. 5 through 8.

It should be noted that the methods described above describe possible implementations, and that the operations and the steps may be rearranged or otherwise modified and that other implementations are possible. For example, the operations of block 1615, with respect to FIG. 16, may occur prior to the operations of block 1610. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1λ, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first uplink transmission beam for a random access procedure;
   transmitting, to a base station, a random access message using the first uplink transmission beam;
   selecting a second uplink transmission beam based at least in part on an absence of a random access response from the base station corresponding to the random access message transmitted using the first uplink transmission beam and a current path loss estimate, the second uplink transmission beam having a different transmission direction than the first uplink transmission beam;
   determining a path loss difference between the current path loss estimate and a previous path loss estimate;
   determining an uplink transmission power based at least in part on a power ramping counter value, the path loss difference satisfying a threshold path loss difference, and the selection of the second uplink transmission beam; and
   retransmitting the random access message to the base station using the second uplink transmission beam and the determined uplink transmission power, wherein the power ramping counter value is based at least in part on a number of retransmissions of the random access message and a number of times an uplink transmission beam is selected based at least in part on the absence of the random access response.

2. The method of claim 1, wherein determining the uplink transmission power further comprises
   increasing the uplink transmission power by an additional amount, wherein the additional amount is based at least in part on the number of retransmissions.

3. The method of claim 2, wherein:
   the additional amount is a function of the power ramping counter value.

4. The method of claim 1, wherein the power ramping counter value is equal to the number of retransmissions minus the number of uplink transmission beam changes.

5. The method of claim 1, wherein determining the uplink transmission power further comprises:
   maintaining the power ramping counter value based at least in part on the second uplink transmission beam being different than the first uplink transmission beam, wherein the uplink transmission power is based at least in part on the maintained power ramping counter value.

6. The method of claim 1, wherein determining the uplink transmission power further comprises:
increasing the uplink transmission power by an additional amount, wherein the additional amount is equal to a power ramped amount associated with transmission of the random access message using the first uplink transmission beam.

7. The method of claim 1, further comprising:
receiving, from the base station, a maximum retransmission number, wherein retransmitting the random access message is based at least in part on the maximum retransmission number.

8. The method of claim 7, wherein the maximum retransmission number is associated with at least one of a total number of retransmission attempts of the random access message, a number of retransmission attempts of the random access message for each of a plurality of uplink transmission powers, a number of retransmission attempts of the random access message for each of a plurality of random access resources, or a number of retransmission attempts of the random access message for each combination of uplink transmission powers and random access resources.

9. The method of claim 1, further comprising:
selecting a random access resource for retransmission of the random access message, the random access resource corresponding to a lowest uplink transmission power.

10. The method of claim 1, wherein determining the uplink transmission power further comprises:
increasing the uplink transmission power by an additional amount based at least in part on determining that the path loss difference is greater than the threshold path loss difference.

11. The method of claim 1, wherein determining the uplink transmission power further comprises:
maintaining the uplink transmission power based at least in part on determining that the path loss difference is less than the threshold path loss difference.

12. The method of claim 1, wherein the previous path loss estimate is associated with the transmission of the random access message using the first uplink transmission beam.

13. The method of claim 1, wherein the previous path loss estimate is associated with a previous retransmission of the random access message.

* * * * *